US012650027B2

(12) United States Patent
Yang et al.

(10) Patent No.: US 12,650,027 B2
(45) Date of Patent: Jun. 9, 2026

(54) TUBULAR SECTION FOR A WIND TURBINE TOWER

(71) Applicant: SHANGHAI FENGLING RENEWABLES CO., LTD., Shanghai (CN)

(72) Inventors: Wei Yang, Shanghai (CN); Mengyuan Li, Shanghai (CN); Bing Zhang, Shanghai (CN); Jiangyi Song, Shanghai (CN); Yong Yan, Shanghai (CN); Binyi Chen, Shanghai (CN)

(73) Assignee: SHANGHAI FENGLING RENEWABLES CO., LTD., Shanghai (CN)

( * ) Notice: Subject to any disclaimer, the term of this patent is extended or adjusted under 35 U.S.C. 154(b) by 183 days.

(21) Appl. No.: 18/635,464

(22) Filed: Apr. 15, 2024

(65) Prior Publication Data

US 2024/0263481 A1 Aug. 8, 2024

Related U.S. Application Data

(63) Continuation of application No. PCT/CN2022/125415, filed on Oct. 14, 2022.

(30) Foreign Application Priority Data

Oct. 18, 2021 (CN) ......................... 202111210407.3
Oct. 18, 2021 (CN) ......................... 202111212247.6
(Continued)

(51) Int. Cl.
E04H 12/12 (2006.01)
E04H 12/34 (2006.01)
F03D 13/20 (2016.01)
(52) U.S. Cl.
CPC ........... E04H 12/12 (2013.01); E04H 12/342 (2013.01); F03D 13/205 (2023.08)

(58) Field of Classification Search
CPC ..... E04H 12/12; E04H 12/342; E04H 12/185; E04H 12/341; F03D 13/205; F03D 13/20
(Continued)

(56) References Cited

U.S. PATENT DOCUMENTS

| | | | | | |
|---|---|---|---|---|---|
| 1,041,389 | A | * | 10/1912 | Wiederholdt | E04C 1/00 52/425 |
| 4,104,868 | A | * | 8/1978 | Jackson | E04F 17/02 52/249 |
| 9,062,662 | B1 | * | 6/2015 | Johnson | F03D 13/10 |
| 9,689,175 | B2 | * | 6/2017 | Zavitz | F03D 13/20 |

(Continued)

FOREIGN PATENT DOCUMENTS

| | | |
|---|---|---|
| CN | 101591972 | 12/2009 |
| CN | 202850194 | 4/2013 |

(Continued)

OTHER PUBLICATIONS

EPO, Extended European Search Report for 22882766.3, Jul. 10, 2025.

(Continued)

*Primary Examiner* — Brent W Herring
(74) *Attorney, Agent, or Firm* — Hodgson Russ LLP

(57) ABSTRACT

A tubular section includes a plurality of prefabricated concrete formworks (11) in a closed connection to form a regular polygonal structure, each prefabricated concrete formwork (11) includes two prefabricated wall panels (111) spaced apart from each other and a connecting piece (113) connecting the two prefabricated wall panels (111), an accommodation cavity (112) is defined between the two prefabricated wall panels (111), the accommodation cavities (112) of the plurality of prefabricated concrete formworks (11) are in communication with each other, all the accommodation cavities (112) are filled with concrete (16), and the concrete (16) in all the accommodation cavities (112) is solidified to be integral as a whole.

20 Claims, 18 Drawing Sheets

(30) Foreign Application Priority Data

| Oct. 18, 2021 | (CN) | ......................... | 202111212262.0 |
| Oct. 18, 2021 | (CN) | ......................... | 202111212275.8 |
| Oct. 18, 2021 | (CN) | ......................... | 202111212278.1 |
| Oct. 18, 2021 | (CN) | ......................... | 202111212282.8 |
| Oct. 18, 2021 | (CN) | ......................... | 202111224239.3 |

(58) Field of Classification Search

USPC ....................................................... 52/742.14

See application file for complete search history.

(56) References Cited

U.S. PATENT DOCUMENTS

| 2008/0313972 A1 * | 12/2008 | Grob ...................... | F03D 13/20 |
| | | | 264/32 |
| 2009/0266004 A1 * | 10/2009 | Willey ................. | B29C 70/222 |
| | | | 264/299 |
| 2010/0154321 A1 * | 6/2010 | Javierre Lardies ....... | E04C 3/34 |
| | | | 52/340 |
| 2015/0292229 A1 * | 10/2015 | Kollegger ............... | E04B 1/166 |
| | | | 52/742.14 |
| 2018/0142491 A1 * | 5/2018 | Zavitz .................... | E04H 12/18 |
| 2019/0136566 A1 * | 5/2019 | Viselli .................... | E04H 12/16 |

FOREIGN PATENT DOCUMENTS

| CN | 104358330 | 2/2015 | | |
| CN | 106884481 | 6/2017 | | |
| CN | 109184106 | 1/2019 | | |
| CN | 109322793 | 2/2019 | | |
| CN | 110042945 | 7/2019 | | |
| CN | 111691581 | 9/2020 | | |
| CN | 212026728 | 11/2020 | | |
| CN | 112392664 | 2/2021 | | |
| DE | 4023465 | 2/1992 | | |
| DE | 4023465 A1 * | 2/1992 | ............. | E04H 12/12 |
| EP | 2963206 A1 * | 1/2016 | ........... | E04H 12/341 |
| WO | WO-9201850 A1 * | 2/1992 | ............. | E04H 12/12 |

OTHER PUBLICATIONS

CNIPA, First Office Action for CN Application No. 202111212262. 0, Jun. 19, 2025.

CNIPA, First Office Action for CN Application No. 202111212275. 8, Jun. 20, 2025.

CNIPA, First Office Action for CN Application No. 202111212278. 1, Apr. 21, 2025.

CNIPA, First Office Action for CN Application No. 202111212282. 8, Jun. 20, 2025.

WIPO, International Search Report for PCT/CN2022/125415, Jan. 11, 2023.

CNIPA, Second Office Action for CN Application No. 202111210407. 3, Sep. 18, 2025.

CNIPA, First Office Action for CN Application No. 202111212247. 6, Nov. 19, 2025.

\* cited by examiner

10 outside of tower inside of tower

194

196          196

183

111          18          111

TUBULAR SECTION FOR A WIND TURBINE TOWER

CROSS-REFERENCE TO RELATED APPLICATIONS

This application is a continuation of International Application No. PCT/CN2022/125415, filed Oct. 14, 2022, which claims priority Chinese Patent Application No. 202111210407.3, Chinese Patent Application Ser. No. 202111212275.8, Chinese Patent Application No. 202111224239.3, Chinese Patent Application No. 202111212278.1, Chinese patent application No. 202111212247.6, Chinese patent application No. 202111212282.8, and Chinese patent application Ser. No. 202111212262.0, all filed on Oct. 18, 2021. The entire disclosures of the above-identified applications are incorporated herein by reference.

FIELD

The present disclosure relates to a field of tower construction technology, and more particularly to a tubular section for a wind turbine tower and a construction method for the wind turbine tower.

BACKGROUND

Existing concrete towers of wind turbines in the market are all fully prefabricated concrete towers. In order to ensure productivity, such construction process requires investment in the construction of a lot of prefabricated components production factories and necessary formworks for component production, which is costly and requires a lot of labor.

For the fully prefabricated concrete tower, in the consideration of the formwork cost, an appearance of a product cannot be changed freely, since each change means an investment in the formwork.

Generally, a bottom diameter of the fully prefabricated concrete high tower is relatively large. In the consideration of the feasibility of transportation, each pipe segment at bottom of the tower is spliced by two or three prefabricated pipe segments. However, the design of joints leads to discontinuous stress at vertical joint between the pipe segments, and only a simple connection structure is able to increase resistance.

SUMMARY

The present disclosure aims to solve at least one of the technical problems in a related art to a certain extent. To this end, embodiments of the present disclosure proposes a tubular section, including a plurality of prefabricated concrete formworks, the plurality of prefabricated concrete formworks being in a closed connection to form a regular polygonal structure, each prefabricated concrete formwork including two prefabricated wall panels spaced apart from each other and a connecting piece connecting the two prefabricated wall panels, an accommodation cavity being defined between the two prefabricated wall panels, the accommodation cavities of the plurality of prefabricated concrete formworks being in communication with each other, all the accommodation cavities being filled with concrete, and the concrete in all the accommodation cavities being solidified to be integral as a whole.

The embodiments of the present disclosure further provide a tower, including a plurality of tubular sections of the embodiments of the present disclosure, and the plurality of tubular sections are connected to a predetermined height from bottom to top in sequence.

The embodiments of the present disclosure further provide a wind turbine tower, including a tower of the embodiments of the present disclosure and a wind power generation device arranged on the top of the tower.

Additional aspects and advantages of embodiments of present disclosure will be given in part in the following descriptions, become apparent in part from the following descriptions, or be learned from the practice of the embodiments of the present disclosure.

REFERENCE NUMERALS

Figure 1A:
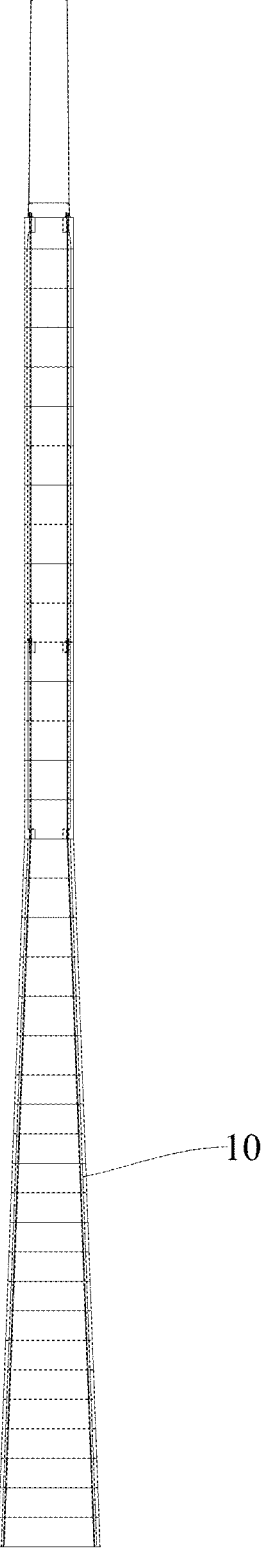
FIG. 1a shows a front view of a tower of an embodiment of the present disclosure.

10—tubular section; 11—prefabricated concrete formwork; 111—prefabricated wall panel; 1111—inner panel face; 1112—outer panel face; 1113—side end face; 1115—chamfer; 1101—extension portion; 112—accommodation space; 113—connecting piece; 12—flexible seal piece; 13—foamed adhesive; 14—connecting member; 141—steel wire rope; 142—rebar anchor ring; 143—vertical rebar; 144—rebar cage; 145—laminated plate; 146—rebar grid sheet; 147—connecting rebar; 15—concrete block; 16—concrete; 17—expansion strip; 20—epoxy resin mortar layer.

DETAILED DESCRIPTION

Embodiments of the present disclosure are further described. Examples of the embodiments are illustrated in the accompanying drawings. The embodiments described below with reference to the accompanying drawings are exemplary, are merely configured to explain the present disclosure, and cannot be construed as a limitation to the present disclosure.

The present disclosure is based on inventor's discovery and understanding of the following facts and problems: the present disclosure replaces prefabricated components production factories and formworks by using a prefabricated concrete formwork to prefabricate a semi-finished product of rebar concrete, and applies the semi-finished product to wind turbine tower industry for the first time, so as to save investments in factories and formworks.

The present disclosure aims to solve at least one of the technical problems in a related art to a certain extent. To this end, embodiments of the present disclosure proposes a tubular section, including a plurality of prefabricated concrete formworks, the plurality of prefabricated concrete formworks being in a closed connection to form a regular polygonal structure, each prefabricated concrete formwork including two prefabricated wall panels spaced apart from each other and a connecting piece connecting the two prefabricated wall panels, an accommodation cavity being defined between the two prefabricated wall panels, the accommodation cavities of the plurality of prefabricated concrete formworks being in communication with each other, all the accommodation cavities being filled with concrete, and the concrete in all the accommodation cavities being solidified to be integral as a whole.

The tubular section of the embodiment of the present disclosure utilizes product of the prefabricated concrete formwork to fully combine the prefabricated wall panel with the cast-in-situ concrete, and the tubular section is formed as a whole, so as to ensure the continuity in the force of the tubular section, and the structure of the tower constructed by using the tubular section is more safe and reliable. Further, an appearance of the tubular section may be flexible and versatile, regardless of the change of the brand and model of the wind power host, the tubular section may be adjusted flexibly.

The embodiments of the present disclosure further provide a tower, including a plurality of tubular sections of the embodiments of the present disclosure, and the plurality of tubular sections are connected to a predetermined height from bottom to top in sequence.

The tower of the embodiments of the present disclosure adopts the tubular section of the embodiment of the present disclosure, so the structural stability and safety of the constructed tower are improved.

The embodiments of the present disclosure further provide a wind turbine tower, including a tower of the embodiments of the present disclosure and a wind power generation device arranged on the top of the tower.

The wind turbine tower of the embodiments of the present disclosure adopts the tower of the embodiments of the present disclosure, so the safety is improved.

The embodiments of the present disclosure further provide a construction method of a tower, including the following steps:

S1, providing prefabricated concrete formworks, each prefabricated concrete formwork including two prefabricated wall panels spaced apart from each other and a connecting piece connecting the two prefabricated wall panels, an accommodation space being defined between the two prefabricated wall panels; hoisting a plurality of prefabricated concrete formworks to the splicing platform in sequence to form a regular polygonal structure, and the accommodation space of the plurality of prefabricated concrete formworks being in communication with each other;

S2, casting the concrete into all accommodation space, and the tubular sections being prepared after the concrete is solidified;

S3, hoisting the prepared tubular sections in turn and the tubular sections being connected with each other to a predetermined height.

The construction method of the tower according to the embodiments of the present disclosure adopts the prefabricated concrete formwork as raw material for building, and there is no need to prepare the formwork for building the tubular section. The manufacturing cost of the prefabricated concrete formwork is low, which greatly speeds up the construction speed of the tower and saves the construction cost.

A tubular section of embodiments of the present disclosure is a part of a prefabricated tower, and stability and firmness of the tubular section are directly related to quality of the tower.

Figure 2:
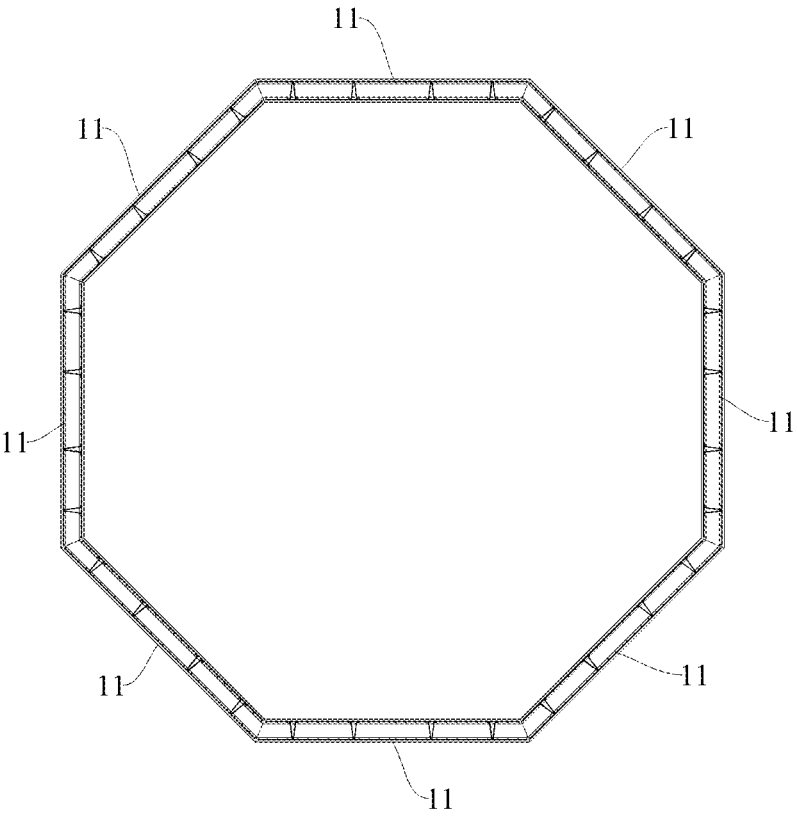
FIG. 2 is a top view of a tubular section according to an embodiment of the present disclosure in which concrete is not cast.
Figure 3:
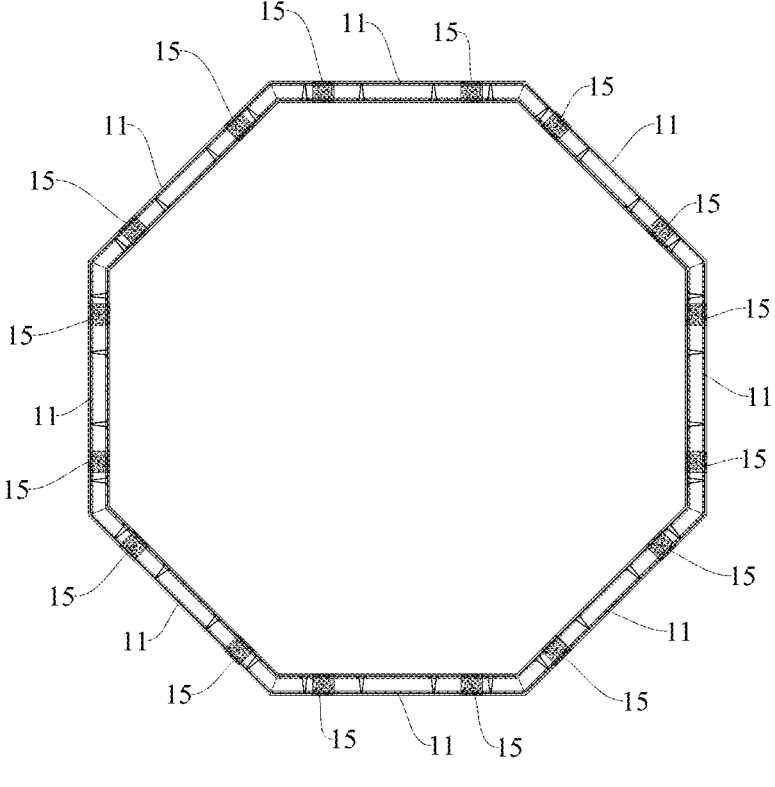
FIG. 3 is a top view of a tubular section according to an embodiment of the present disclosure, in which a concrete block is provided.
Figure 4:
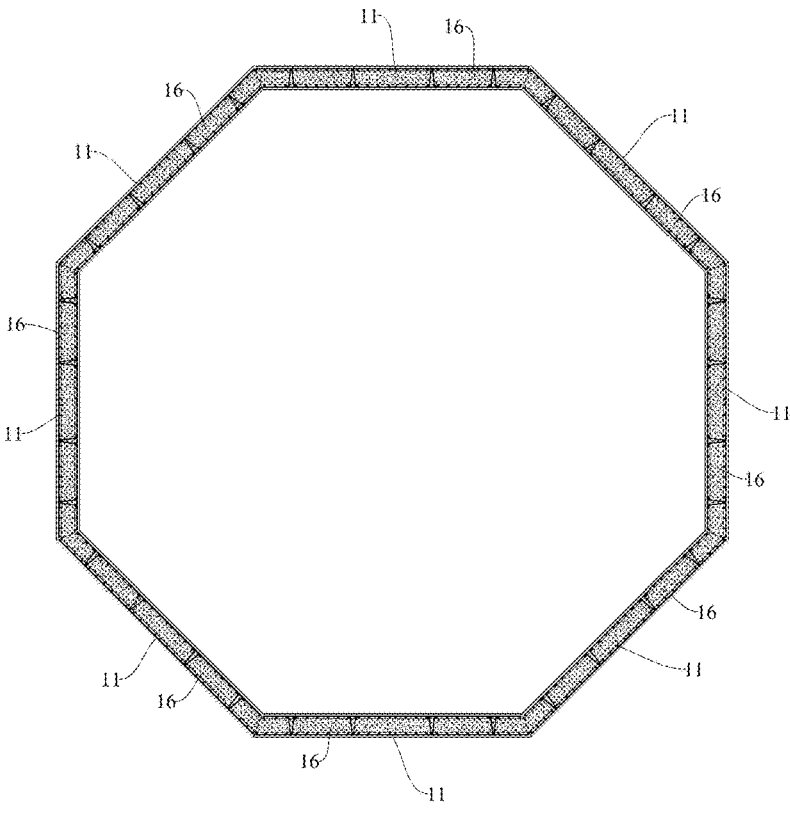
FIG. 4 is a top view of a tubular section according to an embodiment of the present disclosure, in which concrete is cast.

Referring to FIG. 2 to FIG. 4, the tubular section 10 includes a plurality of prefabricated concrete formworks 11 and the plurality of prefabricated concrete formworks 11 are in a closed connection to form a regular polygonal structure, such as a regular octagon, a regular nonagon or a regular decagon.

Figure 5:
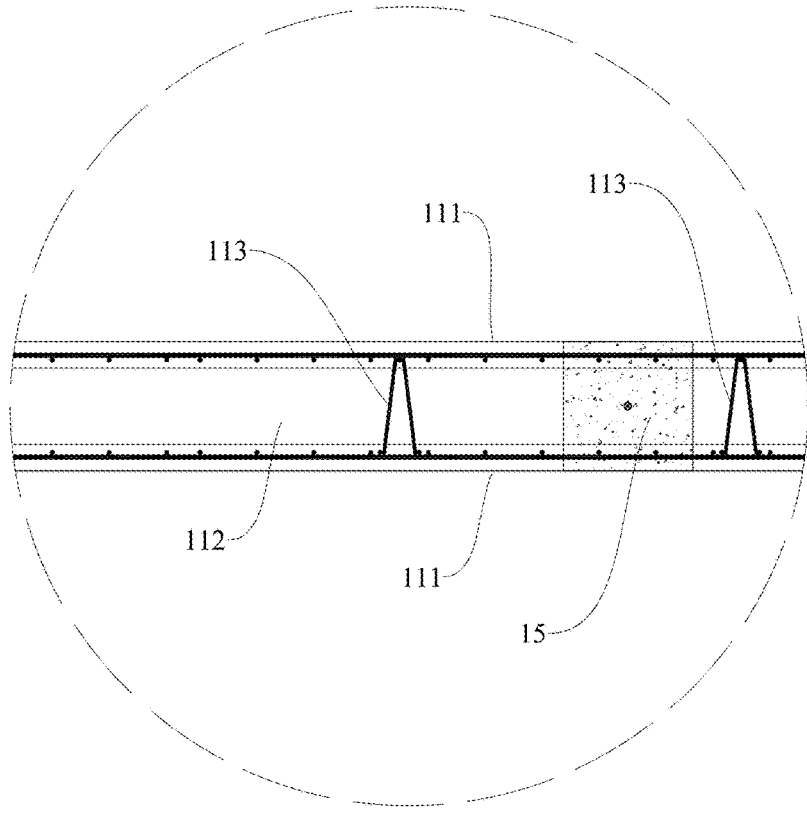
FIG. 5 is a partially enlarged schematic view of FIG. 3.

Referring to FIG. 5, each prefabricated concrete formwork 11 includes two prefabricated wall panels 111 parallel to each other and spaced apart from each other, and a connecting piece 113 connecting the two prefabricated wall panels 111. An accommodation cavity 112 is defined between the two prefabricated wall panels 111, the accommodation cavities 112 of the plurality of prefabricated concrete formworks 11 is in communication with each other, and all the accommodation cavities 112 are filled with concrete 16, and the concrete in all the accommodation cavities 112 are solidified to be integral as a whole. The prefabricated wall panels 111 themselves may be of reinforced concrete structure.

The prefabricated concrete formwork 11 may be purchased directly from construction market. Thus, during the production of the tubular section 10, there is no need to prepare a formwork to separately open formwork for pipe segments of the tower, so as to reduce cost. Further, the purchased prefabricated concrete formwork 11 may be directly transported to construction site for splicing, so as to reduce cost for transportation.

The following takes a regular octagonal tube section as an example to describe method of splicing the tubular section. The method of splicing the tubular section 10 includes: hoisting eight prefabricated concrete formworks 11 onto a splicing platform, respectively, adjusting an angle and position of each prefabricated concrete formwork 11 to splice a regular octagonal structure and to communicating the accommodation space 112 of adjacent prefabricated concrete formworks 11 with each other, connecting and fixing the adjacent prefabricated concrete formworks 11, and then, casting the concrete into the accommodation space 112 in order to solidify the concrete, thereby firmly fixing the eight prefabricated concrete formworks 11.

It should be understood that specific shape and size of the tubular section 10 may be selected according to the tower to be constructed.

Figure 9:
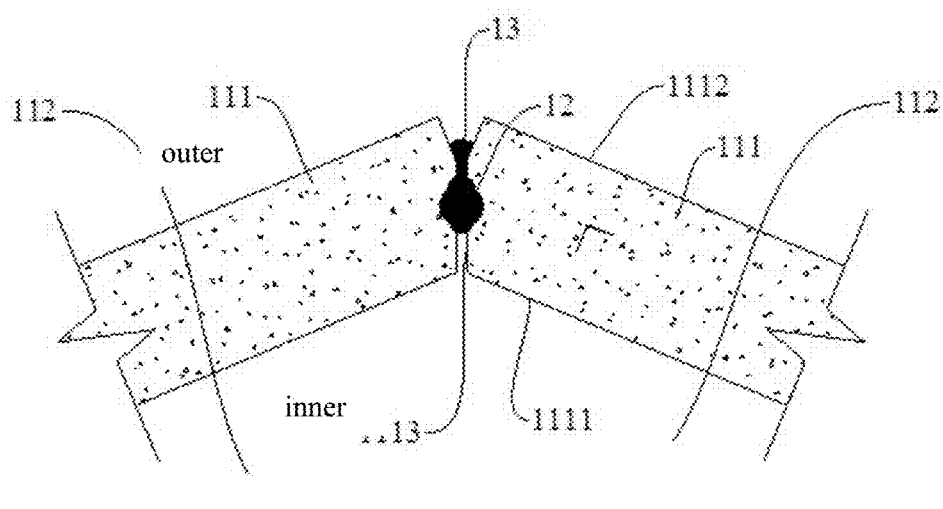
FIG. 9 is a structural view of a connection position of two prefabricated concrete formworks according to an embodiment of the present disclosure, in which connection member is hidden.
Figure 9:
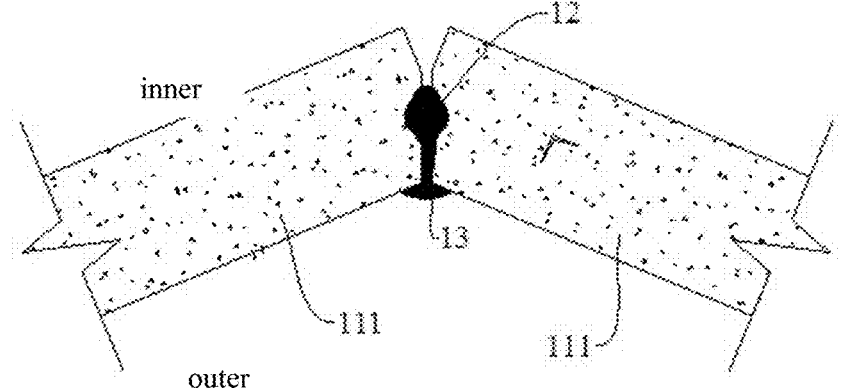

In some embodiments, the tubular section 10 includes a plurality of prefabricated concrete formworks 11. Referring to FIG. 9, a joint between adjacent prefabricated wall panels 111 is provided with a flexible seal piece 12 and a foamed adhesive 13 in sequence from inside to outside, and both the flexible seal piece 12 and the foamed adhesive 13 extend from top to bottom along the joint. The term "inside" herein refers to a space where concrete 16 needs to be cast, i.e., the accommodation cavity 112.

A connecting member 14 is provided between any adjacent prefabricated concrete formworks 11 and located in adjacent accommodation space 112, and the connecting member 14 is cast in the concrete 16. The flexible seal piece 12 and the foamed adhesive 13 are configured for sealing to avoid an outflow of the concrete from the joint during the subsequent casting. The connecting member 14 may improve connection firmness of the two prefabricated concrete formworks 11, so as to improve structural stability of the tubular section 10.

Exemplarily, the flexible seal piece 12 may be a rubber tube or a latex rod with a certain deformation capacity, so as to better seal at the joint between adjacent prefabricated wall panels 111 and improve sealing effect.

The concrete 16 is cast after the flexible seal piece 12 and the foamed adhesive 13 are arranged. The flexible seal piece 12 and the foamed adhesive 13 have a sealing function, so as to avoid or reduce the outflow of the concrete from the joint between the two prefabricated wall panels 111.

Referring to FIG. 9, the prefabricated wall panel 111 has an inner panel face 1111, an outer panel face 1112, and a side end face 1113. The inner panel face 1111 is parallel to the outer panel face 1112, and is inclined relative to the side end face 1113, and the joint between the adjacent prefabricated wall panels 111 is located between two side end faces 1113 parallel and opposite to each other. Thus, the flexible seal piece 12 and the foam adhesive 13 have good sealing performance, so as to ensure that the concrete does not outflow from the joint between the two prefabricated wall panels 111 during the casting.

Exemplarily, at least one of the two opposite side end faces 1113 is defined with a groove extending from top to bottom along the joint, and the flexible seal piece 12 and/or foamed adhesive 13 are located in the groove, thereby further improving the sealing performance of the joint.

Figure 11:
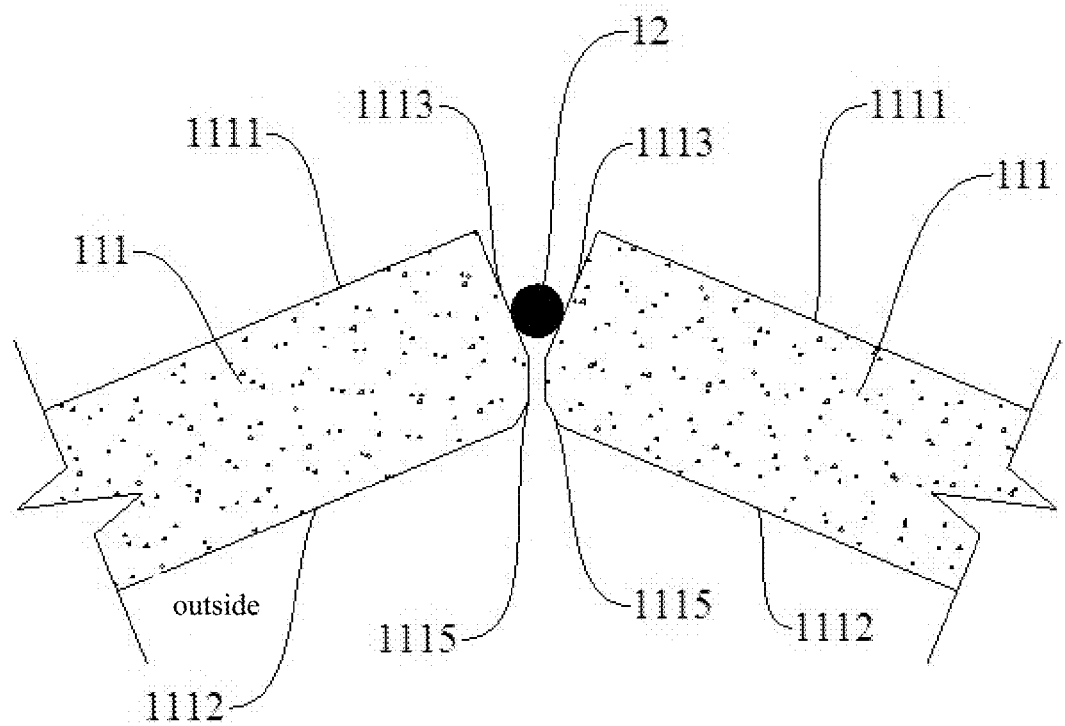
FIG. 11 is a partial view of a connection position of two prefabricated wall panels according to an embodiment of the present disclosure.
Figure 12:
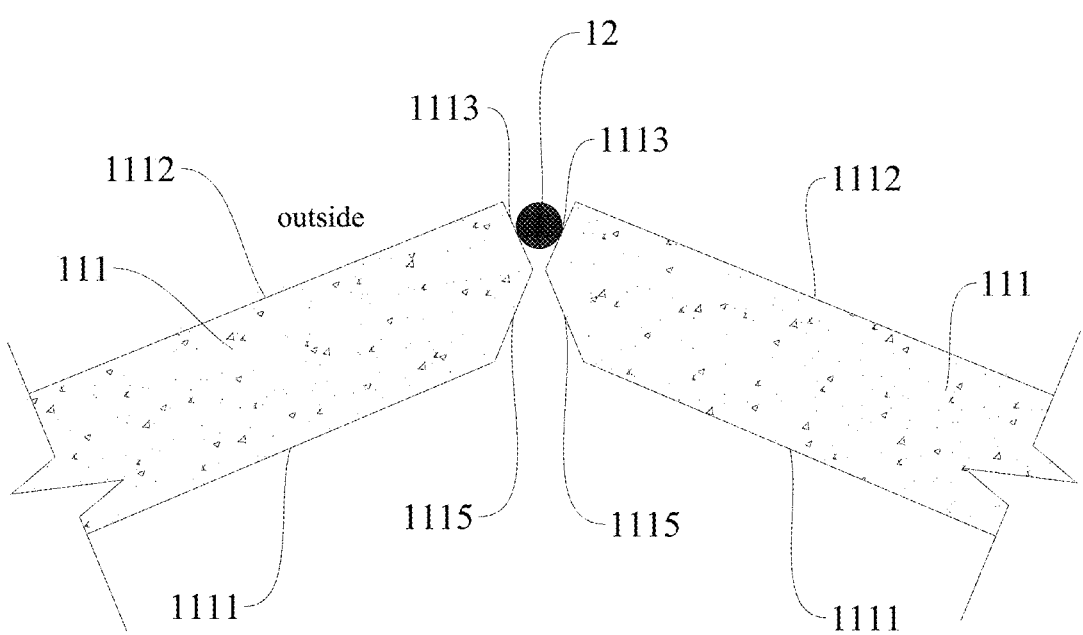
FIG. 12 is a partial view of a connection position of two prefabricated wall panels according to an embodiment of the present disclosure.

Referring to FIGS. 11 and 12, the side end face 1113 is perpendicular to the inner panel face 1111, the joint between the adjacent prefabricated wall panels 111 is located between two opposite side end faces 1113, and the side end faces 1113 are provided with chamfers 1115 at a position where spacing of the joint is minimal.

As shown in FIG. 11, the chamfers 1115 are arranged at a position close to an outside, and as shown in FIG. 12, the chamfers 1115 are arranged at a position close to an inside. The chamfer 1115 is arranged at the inside (i.e. the side where the accommodation space is located), and the concrete 16 is easier to fill the vertical joint. Since one prefabricated concrete formwork 11 has two prefabricated wall panels 111, at the connection position of the two prefabricated concrete formworks 11, the adjacent prefabricated wall panels 111 located at the outside are connected with each other, and the adjacent prefabricated wall panels 111 located at the inside are connected with each other in the adjacent prefabricated concrete formworks 11. Thus, each of the inside and the outside of an intersection position of the adjacent prefabricated concrete formworks 11 is provided with a sealing structure. As shown in FIG. 9, the sealing structure consists of the flexible seal piece 12 and the foamed adhesive 13. The sealing structure on the inside and outside of the intersection position may be the same or different.

As shown in FIG. 12, during the concrete is cast, a part of the concrete may flow between the adjacent chamfers 1115, and the firmness of the tubular section 10 is improved after the concrete is solidified.

As shown in FIG. 11, the cast concrete presses the flexible seal piece 12, and the joint at the position where the flexible seal piece 12 is located becomes smaller, so as to improve the sealing performance.

Figure 13:
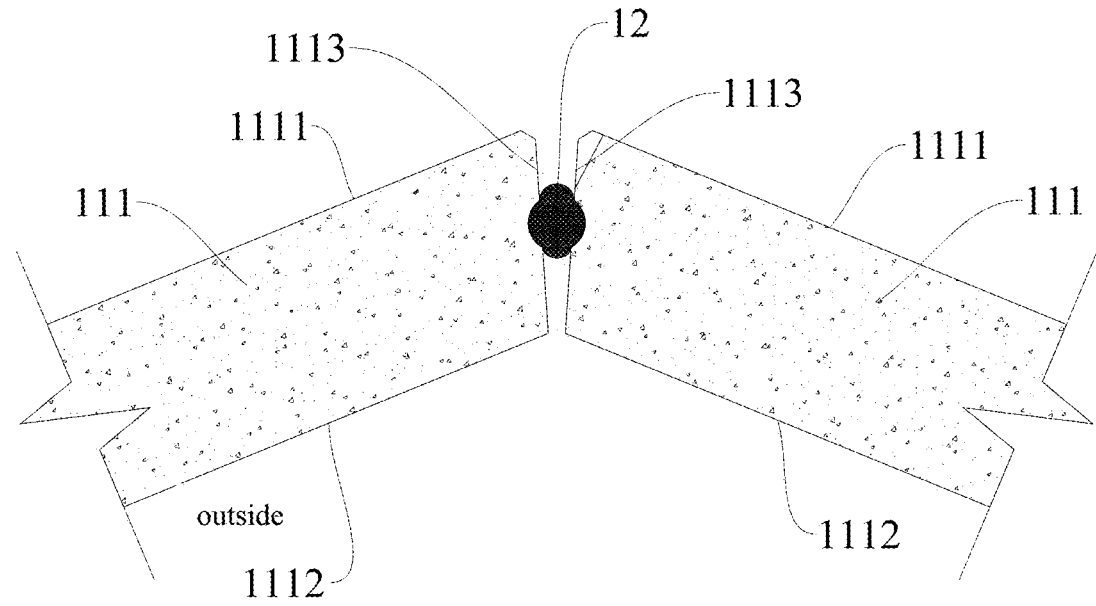
FIG. 13 is a partial view of a connection position of two prefabricated wall panels according to an embodiment of the present disclosure.

In some embodiments, referring to FIG. 13, an included angle between two opposite side end faces 1113 ranges from 5° to 10°, and the spacing of the joint gradually decreases from inside to outside. A groove may be also defined on the side end face 1113 for accommodating the flexible seal piece 12, and the groove may be shaped as a square groove, a semicircular groove, a right angle groove, an obtuse angle groove, an acute angle groove, etc.

Figure 14:
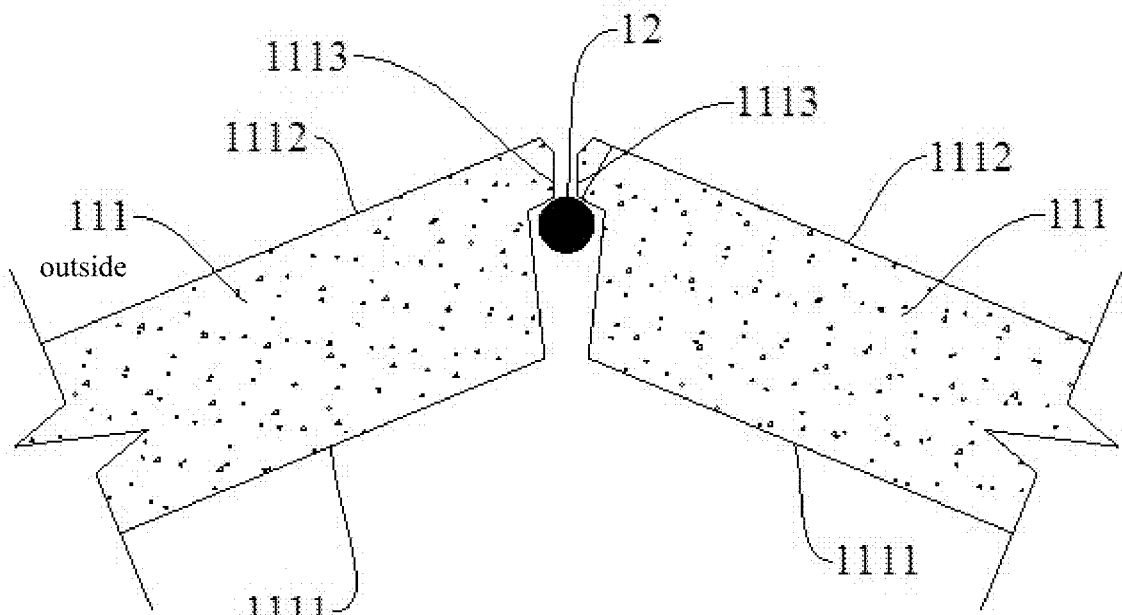
FIG. 14 is a partial view of a connection position of two prefabricated wall panels according to an embodiment of the present disclosure.
Figure 15:
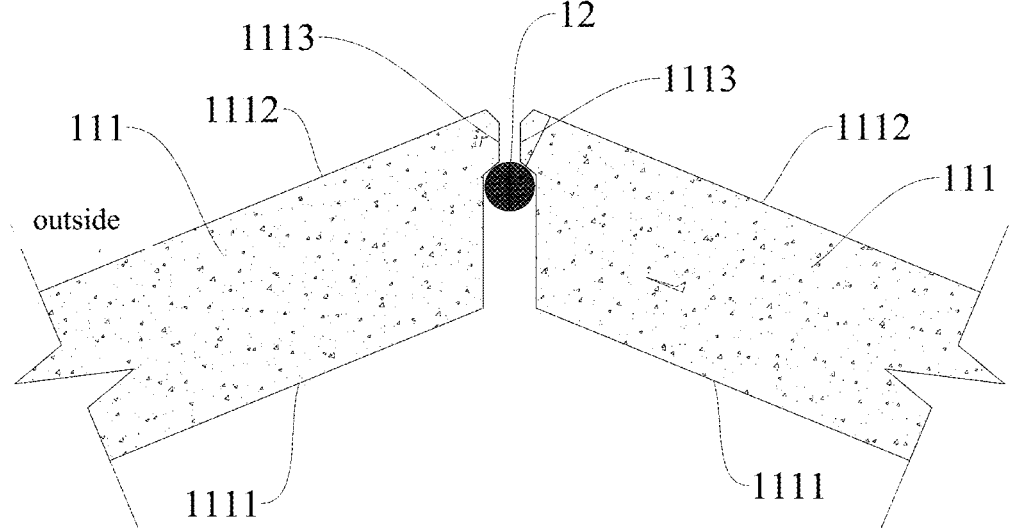
FIG. 15 is a partial view of a connection position of two prefabricated wall panels according to an embodiment of the present disclosure.

In some embodiments, referring to FIGS. 14 and 15, the side end face 1113 may be in a stepped structure, and that is, in FIGS. 14 and 15, the side end face 1113 is in a shape of a zigzag line.

The joint between the adjacent prefabricated wall panels 111 is located between two opposite side end faces 1113, and is divided into at least two segments from inside to outside, such that the joint is divided into an inner joint segment and an outer joint segment. A maximum value of the spacing of the joint between the inner joint segments is greater than a maximum value of the spacing of the joint between the outer joint segments, such that the cast concrete partially flows into the inner joint segment, and compresses the flexible seal piece 12 to improve the sealing performance.

The spacing of the joint between the inner joint segment may gradually increase from inside to outside as shown in FIG. 14, or may be kept constant from inside to outside as shown in FIG. 15.

Figure 16:
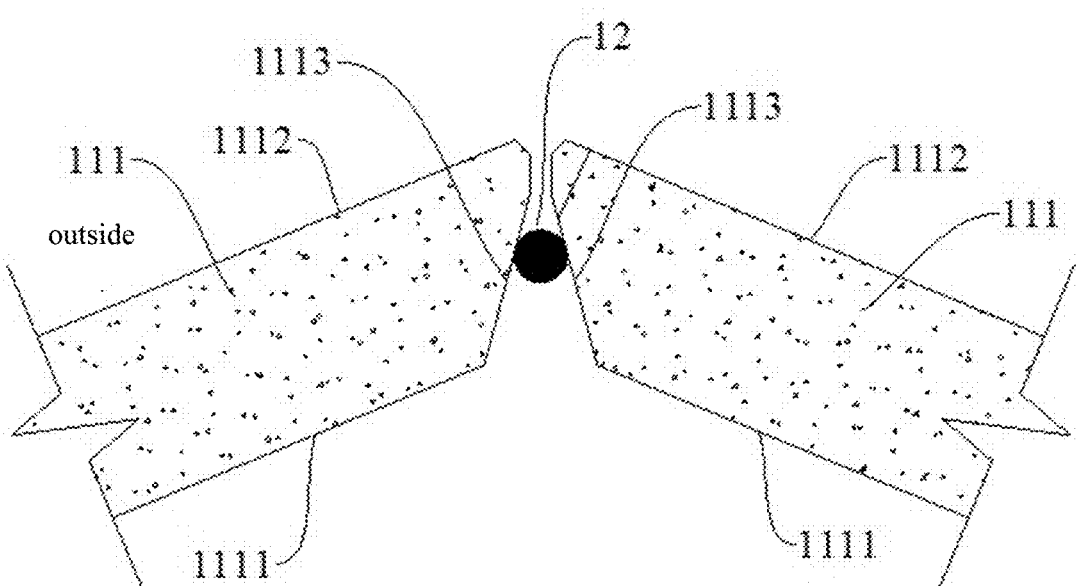
FIG. 16 is a partial view of a connection position of two prefabricated wall panels according to an embodiment of the present disclosure.
Figure 17:
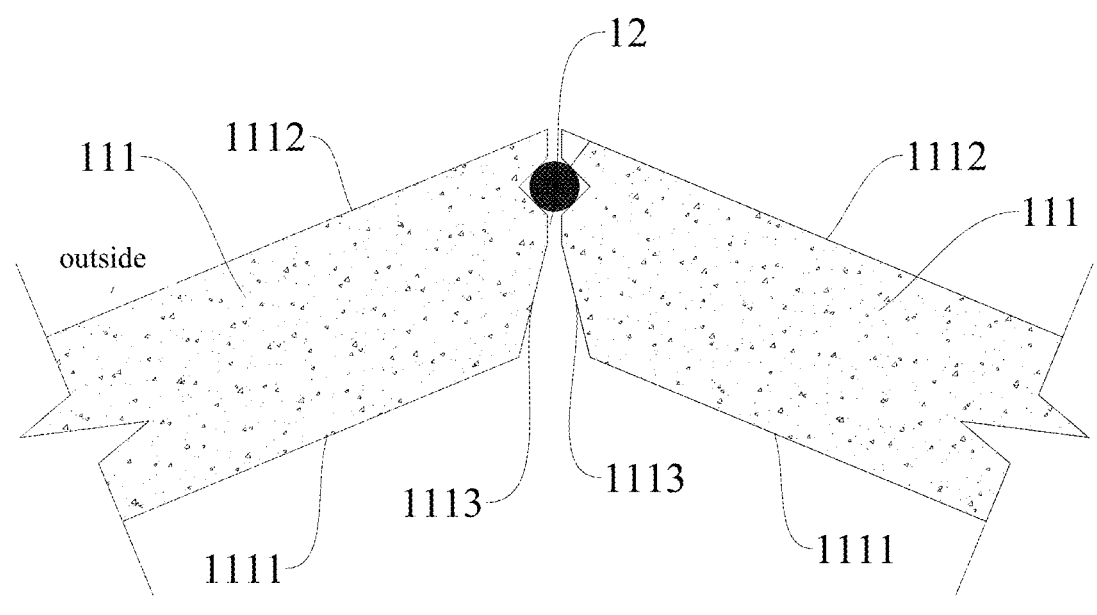
FIG. 17 is a partial view of a connection position of two prefabricated wall panels according to an embodiment of the present disclosure.

In some embodiments, referring to FIGS. 16 and 17, the spacing of the joint gradually decreases from inside to outside such that the joint forms a flared shape.

As shown in FIG. 17, at least one of the two opposite side end faces 1113 is provided with a groove extending from top to bottom along the joint, and the flexible seal piece 12 and/or the foamed adhesive 13 are located in the groove.

Figure 18:
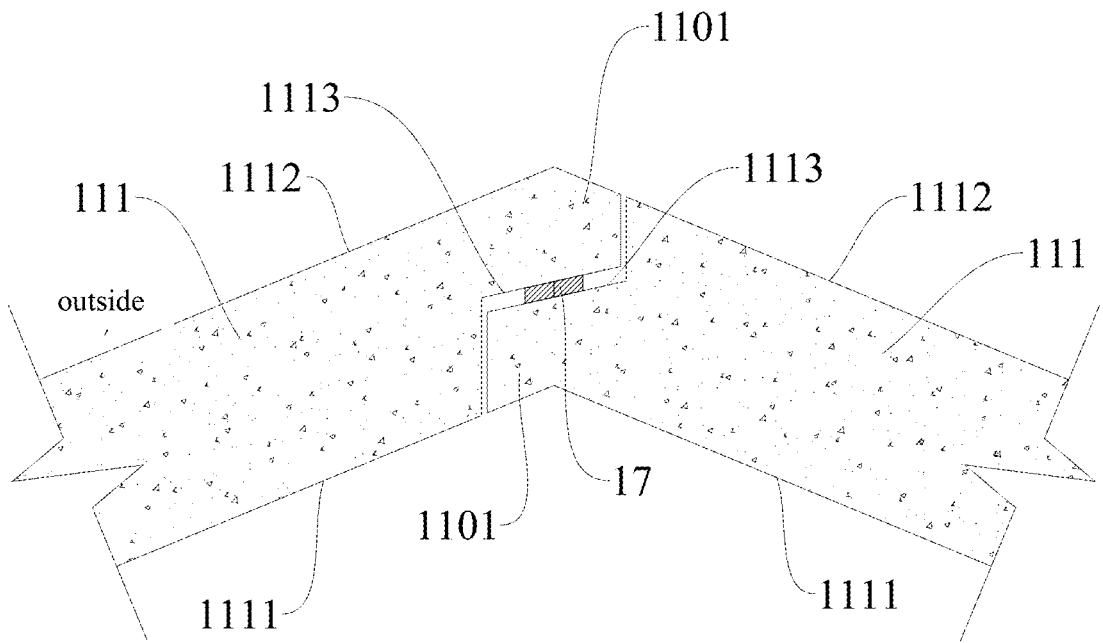
FIG. 18 is a partial view of a connection position of two prefabricated wall panels according to an embodiment of the present disclosure.
Figure 19:
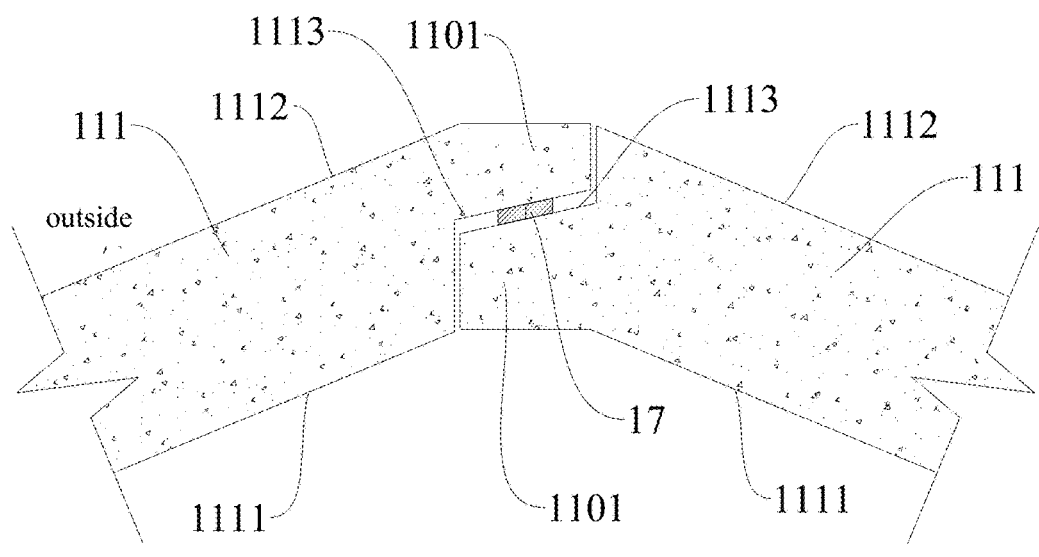
FIG. 19 is a partial view of a connection position of two prefabricated wall panels according to an embodiment of the present disclosure.

In some embodiments, as shown in FIGS. 18 and 19, an extension portion 1101 is formed at a side end of each prefabricated wall panel 111, and the extension portions 1101 of the adjacent prefabricated wall panels 111 are staggered with each other, such that the joint deviates from a radial direction of the tubular section 10. Thus, a flow path of the concrete in the joint is enlarged, so as to further improve the sealing performance.

In some embodiments, referring to FIGS. 18 and 19, contact surface of the opposite extension portion 1101 is a zigzag surface, thereby increasing length of the joint between the two prefabricated wall panels 111 and avoiding the outflow of the concrete 16 from the joint.

In some embodiments, an expansion strip 17 is provided in the joint between the opposite extension portions 1101, and extends from top to bottom along the joint. The expansion strip 17 may be made of rubber. The expansion strip 17 is pressed by the opposite side end faces 1113.

Figure 6:
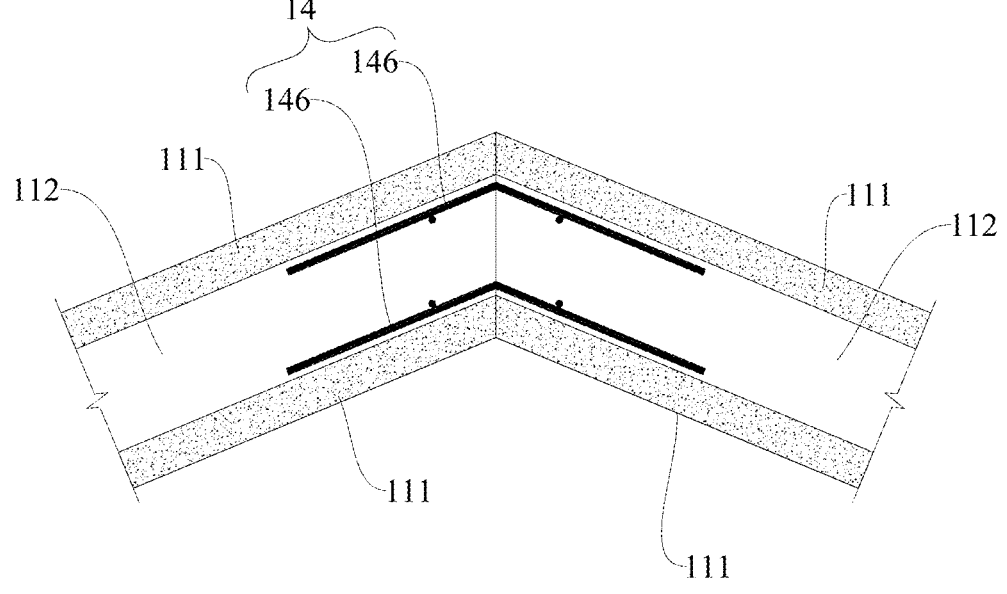
FIG. 6 is a structural view of a connection position of two prefabricated concrete formworks according to an embodiment of the present disclosure.
Figure 7:
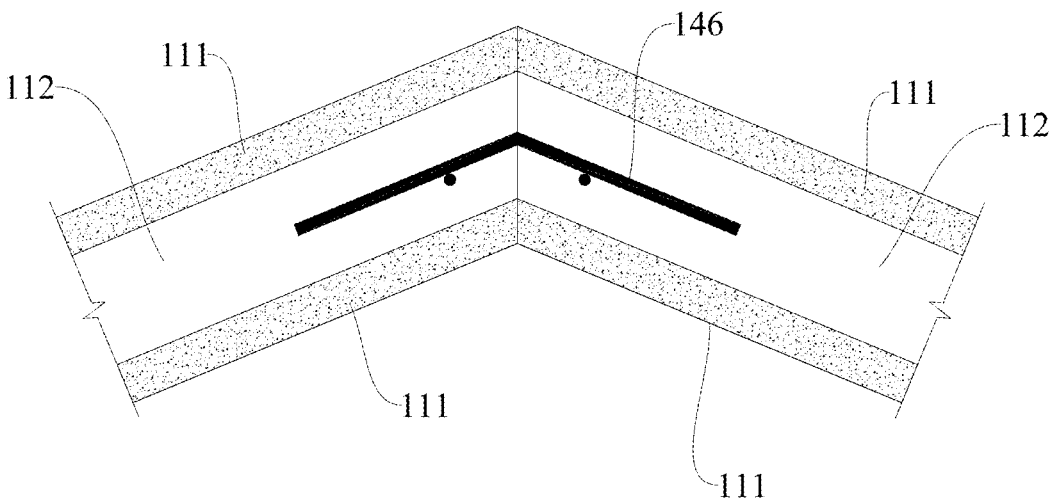
FIG. 7 is a structural view of a connection position of two prefabricated concrete formworks according to an embodiment of the present disclosure.

In some embodiments, at least two prefabricated concrete formworks 11 are arranged parallel to each other. The connecting member 14 includes at least one rebar grid sheet 146, as shown in FIG. 7, and the rebar grid sheet 146 is located in middle of the two prefabricated wall panels 111. As shown in FIG. 6, the rebar grid sheet 146 may be attached to an inner wall of the prefabricated wall panel 111. There may be a plurality of rebar grid sheets 146 arranged at different positions.

In some embodiments, the rebar grid sheet is attached to the inner wall of the prefabricated wall panel 111, the rebar grid sheet is anchored with the two prefabricated wall panels 111 connected with each other, and the anchoring connection further improves the connection reliability.

Exemplarily, a cross section of the rebar grid sheet 146 is V-shaped. The cross section of the rebar grid sheet 146 may also be wavy shape, so as to increase contact area with the concrete 16, thereby improving the connection reliability.

Figure 8:
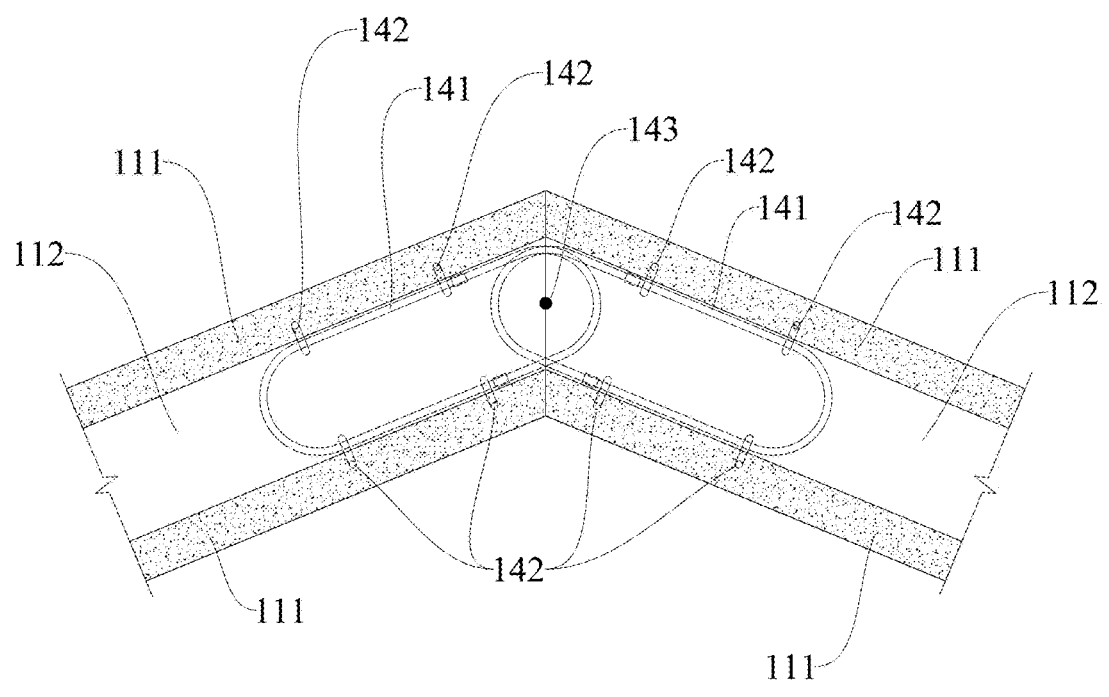
FIG. 8 is a structural view of a connection position of two prefabricated concrete formworks according to an embodiment of the present disclosure.

In some embodiments, referring to FIG. 8, the connecting member 14 includes a plurality of steel wire ropes 141 and a plurality of rebar anchor rings 142, and the rebar anchor ring 142 is embedded in the inner wall of each prefabricated wall panel 111. The steel wire rope 141 passes through the corresponding rebar anchor ring 142, and the steel wire ropes 141 are overlapped in the adjacent prefabricated concrete formworks 11.

The steel wire rope 141 may be arranged as a closed loop structure, and the steel two wire ropes 141 are overlapped with each other, so as to increase the connection reliability after the concrete 16 is cast.

As shown in FIG. 8, the steel wire rope 141 is a closed quoit, and a vertical rebar is inserted in the overlapped steel wire ropes 141, and extends along a height direction of the prefabricated concrete formwork 11. The vertical rebar 143 may ensure that the steel wire ropes 141 are always overlapped with each other, so as to avoid that the flowing concrete disturbs the arranged steel wire ropes 141 during the concrete is cast.

In some embodiments, the plurality of prefabricated concrete formworks 11 are in a closed connection with each other to form a regular octagonal structure. For example, the tubular section 10 may be a structure of a regular hexagon, a regular heptagon, a regular octagon, a regular nonagon, a regular decagon, a regular undecagon, and a regular dodecagon, etc. Thus, shape of the tubular section 10 of the present embodiment may be flexible and versatile.

It should be understood that, for example, the tubular section 10 is a regular octagonal structure, which means that the tubular section generally has a regular octagonal structure, rather than a regular octagonal structure in the strict sense. For example, errors caused by the construction process or the chamfers arranged on the prefabricated concrete formwork 11 may 11 may affect the shape of the tubular section, but the tubular section 10 may still be considered to have the regular octagonal structure.

In some embodiments, referring to FIG. 2 to FIG. 4, the tubular section 10 includes a plurality of prefabricated concrete formworks 11 and the plurality of prefabricated concrete formworks 11 are in a closed connection to form a polygonal structure. Each prefabricated concrete formwork 11 includes two prefabricated wall panels 111 spaced apart from each other along an inner-outer direction, and a connecting piece 113 connecting the two prefabricated wall panels 111. An accommodation space 112 is defined between the two prefabricated wall panels 111, the accommodation space 112 of the plurality of prefabricated concrete formworks 11 is in communication with each other, and all the accommodation space 112 are filled with the concrete 16, and the concrete in all the accommodation space 112 are solidified to be integral as a whole.

In some embodiments, each tubular section 10 further includes a connecting member 14 arranged between the adjacent prefabricated concrete formworks 11 and located in the adjacent accommodation space 112. The connecting members 14 are distributed along a height direction of the prefabricated concrete formwork 11, that is, arrangement of the connecting members 14 in the accommodation space 112 needs to ensure sufficient connection between the adjacent prefabricated concrete formworks 11 as much as possible.

Overall height of the connecting member 14 may be equal to or slightly less than a height of the prefabricated concrete formwork 11. If the connecting member 14 includes a plurality of sub components, spacing between the uppermost sub component and the lowermost sub component may be equal to or slightly less than the height of the prefabricated concrete formwork 11.

The connecting member 14 is cast into the concrete 16 to fix the connecting member 14 in the concrete 16 to ensure the connection reliability.

By changing the number of the prefabricated concrete formworks 11, the shape of the tubular section 10 may be easily changed by splicing without designing a special formwork for each shape of the tubular section 10. The whole structure of the tubular section 10 is more stable after the concrete 16 is cast. The prefabricated wall panel 111 is fully combined with the cast-in-situ concrete 16 (in splicing site), and the tubular section 10 is formed as a whole, so as to ensure the continuity in the force of the tubular section 10, and the structure of the tubular section 10 is more safe and reliable.

Figure 20:
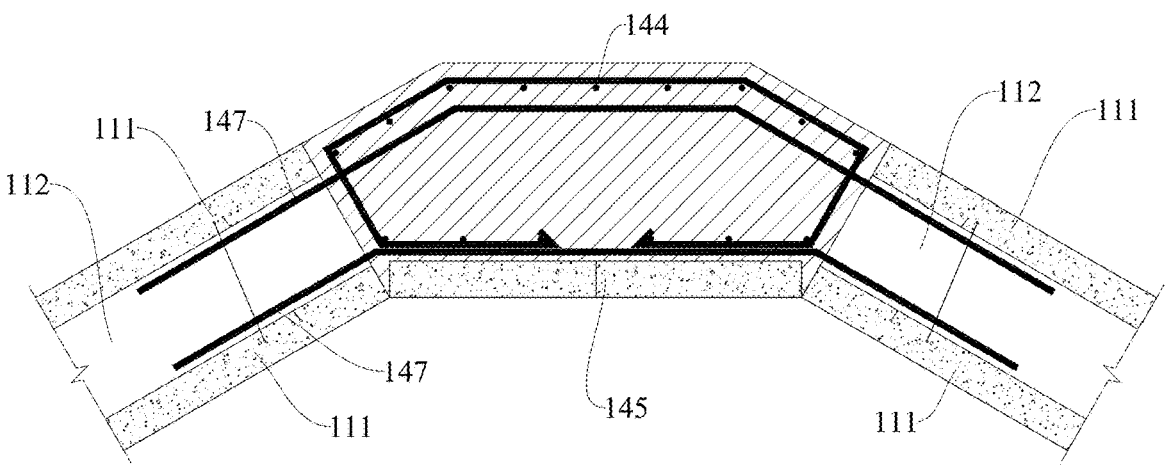
FIG. 20 is a structural view of a connection position of two adjacent prefabricated concrete formworks according to an embodiment of the present disclosure.
Figure 21:
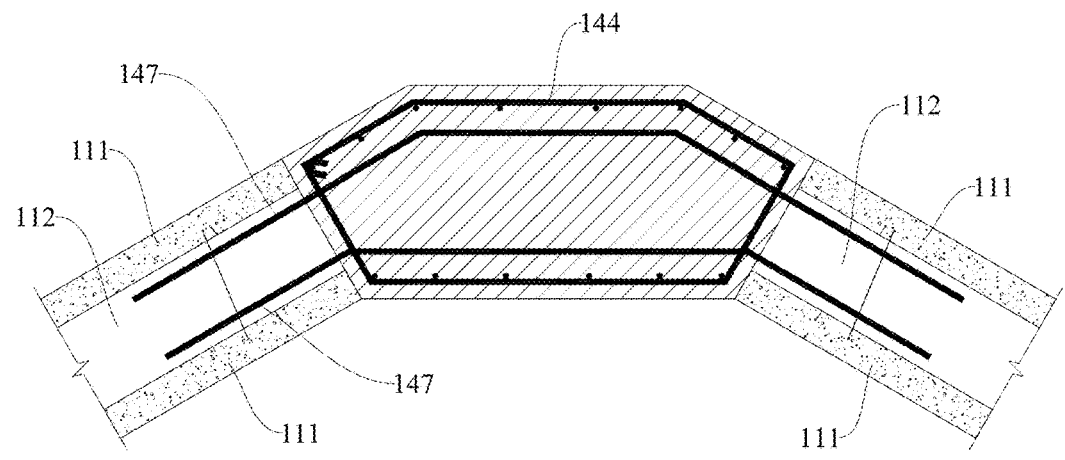
FIG. 21 is a structural view of a connection position of two adjacent prefabricated concrete formworks according to an embodiment of the present disclosure.

In some embodiments, referring to FIGS. 20 and 21, the connecting member 14 includes a polygonal rebar cage 144 and a connecting rebar 147, the rebar cage 144 extends from top to bottom along a side end of the prefabricated concrete formwork 11, and the connecting rebar 147 passes through both the rebar cage 144 and the adjacent accommodation space 112. The rebar cage 144 is filled with the concrete 16 and serves as connection, so as to ensure the adjacent prefabricated concrete formworks 11 to be connected more firmly. The connecting rebar 147 serves as a further connection, and the connecting rebar 147 may be connected and fixed with the rebar cage 144.

During the concrete 16 is cast, formworks may be arranged on two sides of the rebar cage 144, and the formworks may be removed after the cast concrete 16 is solidified. The removed formwork may be reused.

As shown in FIG. 20 and FIG. 21, a cross section of the connecting rebar 147 is three straight lines, and the rebar cage 144 is a hexagonal structure.

In some embodiments, as shown in FIG. 20, the connecting member 14 further includes a laminated plate 145, two side ends of the laminated plate 145 abut against the side ends of the adjacent prefabricated wall panels 111 close to center of the tubular section 1, and two edges of the rebar cage 144 are arranged close to side ends of the two adjacent prefabricated concrete formworks 11. The laminated plate 145 may be made of the same material as the prefabricated wall panel 111, and both may be of a rebar concrete structure. After the laminated plate 145 is arranged, formwork does not need to be provided on this side, and the laminated plate 145 and the concrete 16 are integral as a whole after the concrete 16 is solidified without the removal.

In some embodiments, as shown in FIG. 20, one edge of the rebar cage 144 and one edge of the connecting rebar 147 are both close to the laminated plate 145. In FIG. 20, a lower edge of the rebar cage 144 and middle section of the connecting rebar 147 are close to the laminated plate 145.

In some embodiments, as shown in FIG. 21, the two edges of the rebar cage 144 are arranged close to the side ends of the two adjacent prefabricated concrete formworks 11, respectively, and the edges of the rebar cage 144 do not coincide with the edges of the connecting rebar 147. Moreover, no laminated plate 145 is arranged on two sides of the rebar cage 144 and the formwork is provided on two sides of the rebar cage 144 during the concrete 16 is cast.

In some embodiments, the connecting member 14 is a symmetrical structure, which is easier to produce and manufacture, and has stronger universality in use, which improves convenience for mounting, saves cost, and is conducive to accelerating the construction speed and shortening the construction cycle.

Figure 22:
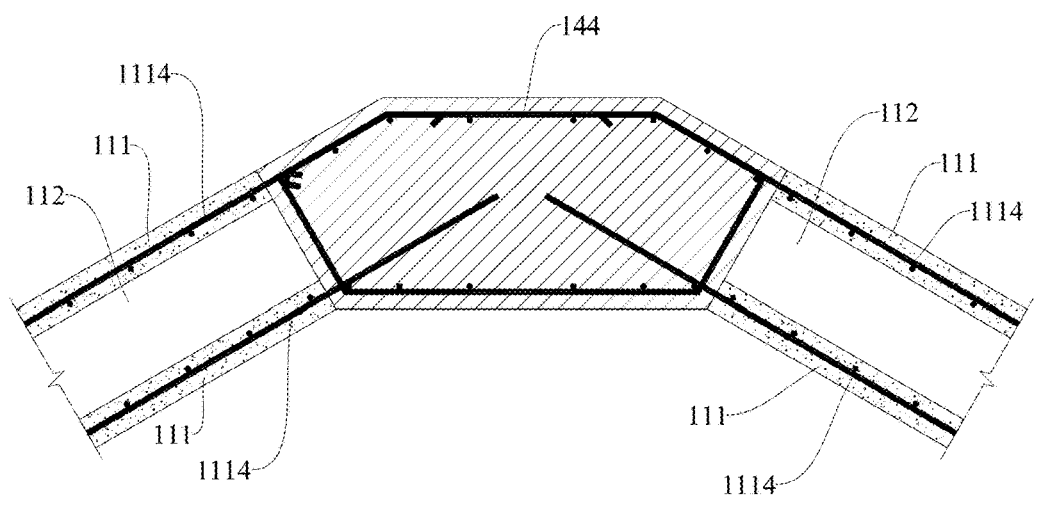
FIG. 22 is a structural view of a connection position of two adjacent prefabricated concrete formworks according to an embodiment of the present disclosure.

In some embodiments, referring to FIG. 22, the connecting member 14 includes the polygonal rebar cage 144, a rebar piece 1114 is provided in the prefabricated wall panel 111, at least a part of the rebar piece 1114 extends into the rebar cage 144, and the rebar cage 144 is filled with the concrete 16.

During the concrete 16 is cast, the formworks may be arranged on two sides of the rebar cage 144 to define a predetermined shape of the concrete bound by the rebar cage 144. The rebar piece 1114 in the prefabricated wall panel 111 is embedded during production of the prefabricated concrete formwork 11, and a part of the rebar piece 1114 is exposed to an outside so as to form a staggered connection with the rebar cage 144. The rebar piece 1114 in the prefabricated wall panel 111 extends into the rebar cage 144, and is cast simultaneously with the rebar cage 144, so as to improve the connection reliability of the adjacent prefabricated concrete formworks 11.

The rebar piece 1114 and the rebar cage 144 may be bound together first and then anchored, or the rebar piece 1114 and the rebar cage 144 are only placed in a staggered manner before the concrete is cast.

In some embodiments, two edges of the rebar cage 144 overlap with the rebar piece 1114. As shown in FIG. 22, the rebar cage 144 is a hexagonal structure, in which upper and lower sides are parallel to each other, and two edges of upper sides of left and right sides overlap with the two rebar pieces 1114, respectively.

The rebar cage 144 itself may be of a symmetrical structure, and the shape of the concrete bound by the rebar cage 144 may be formed with chamfers. For example, as shown in FIG. 11, the chamfers are formed at both inside and outside of the connection position of the two prefabricated concrete formworks 11.

Exemplarily, as shown in FIG. 22, the connecting position of the two prefabricated concrete formworks 11 is provided with an inner chamfer and an outer chamfer, and the two edges of the rebar cage 144 form the inner chamfer and outer chamfer of the connecting position of the two prefabricated concrete formworks 11.

Figure 23:
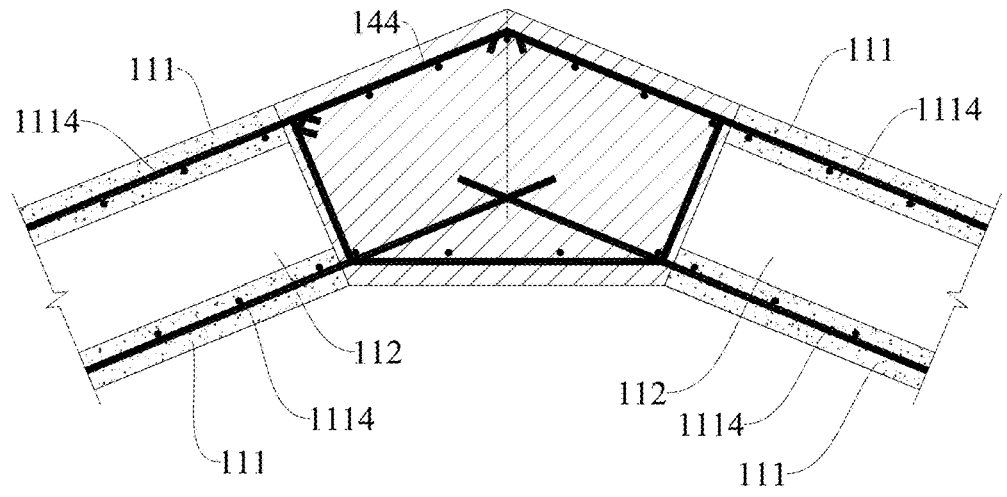
FIG. 23 is a structural view of a connection position of two adjacent prefabricated concrete formworks according to an embodiment of the present disclosure.

In some embodiments, referring to FIG. 23, the connection position of the two prefabricated concrete formworks 11 is provided with the inner chamfer, and one edge of the rebar cage 144 forms the inner chamfer of the connection position of the two prefabricated concrete formworks 11. No chamfer is provided at the outside of the connection position of the two prefabricated concrete formworks 11, and the rebar pieces 1114 in the adjacent prefabricated wall panels 111 are staggered with each other.

Figure 24:
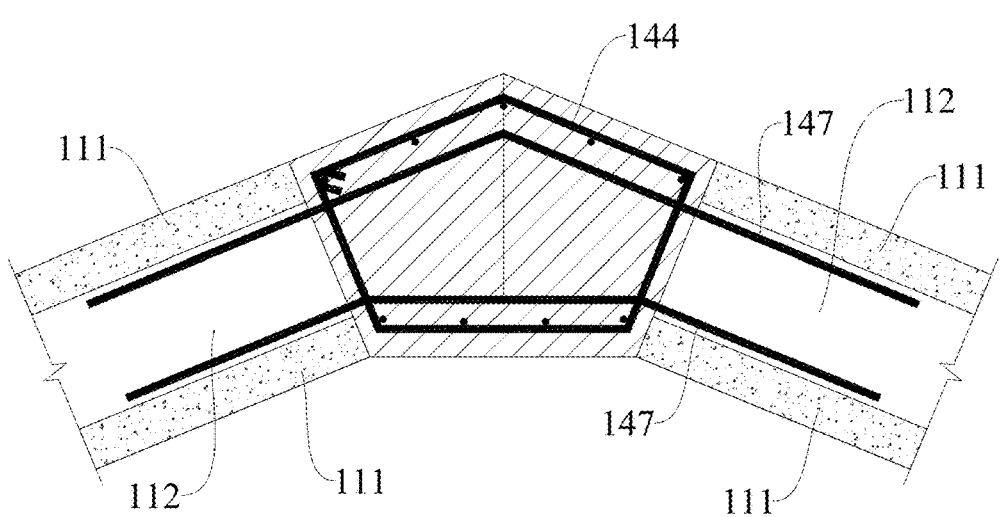
FIG. 24 is a structural view of a connection position of two adjacent prefabricated concrete formworks according to an embodiment of the present disclosure.

In some embodiments, referring to FIG. 24, the connecting member 14 includes a polygonal rebar cage 144 and a connecting rebar 147. The connecting position of the two prefabricated concrete formworks 11 is provided with the inner chamfer, and the outside of the connecting position of the two prefabricated concrete formworks 11 may not be provided with a chamfer.

The connecting rebar 147 is arranged close to the prefabricated wall panel 111, and located in the rebar cage 144 and the two adjacent accommodation space 112, and the rebar cage 144 is filled with the concrete 16. The rebar cage 144 may be of a pentagon structure and be a symmetrical structure, and the arrangement of the rebar cage 144 and the connecting rebar 147 improves the connection reliability of the two prefabricated concrete formworks 11.

Figures 25, 26:
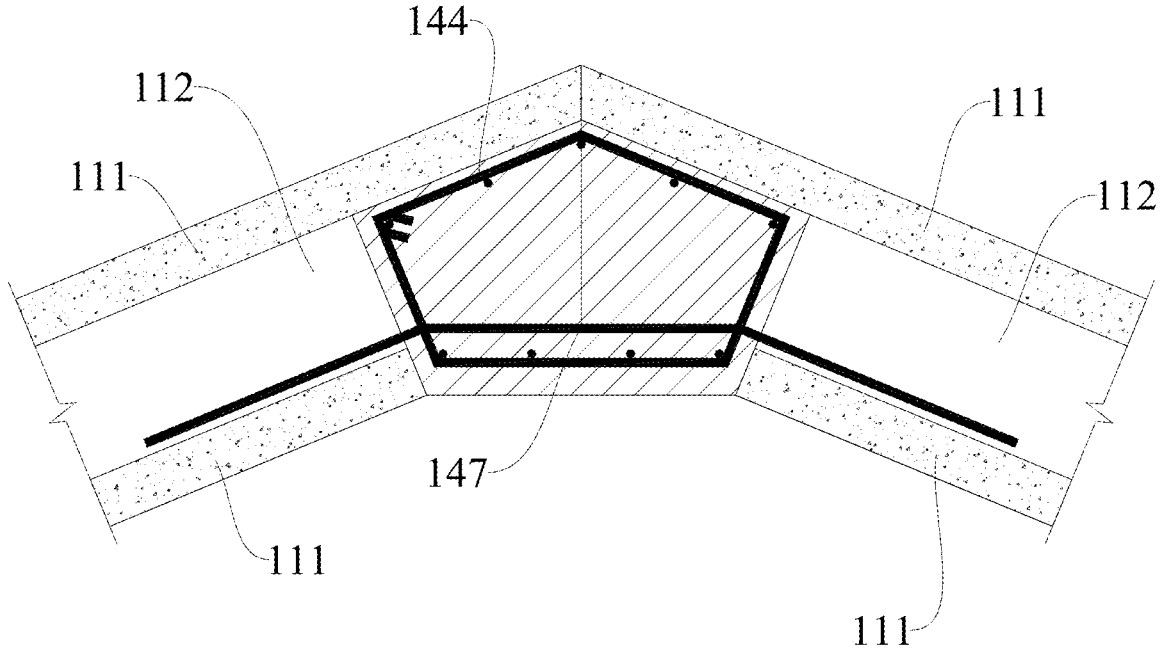
FIG. 25 is a structural view of a connection position of two adjacent prefabricated concrete formworks according to an embodiment of the present disclosure.
FIG. 26 is a structural view of a connection position of two adjacent prefabricated concrete formworks according to an embodiment of the present disclosure.

In some embodiments, referring to FIG. 25, the connecting member 14 includes a polygonal rebar cage 144 and a connecting rebar 147. Two outer prefabricated wall panels 111 in the adjacent prefabricated concrete formworks 11 abut against each other, the connecting rebar 147 is arranged close to two inner prefabricated wall panels 111, the connecting rebar 147 is located in the rebar cage 144 and the two adjacent accommodation space 112, and the rebar cage 144 is filled with the concrete 16.

During construction, since the two outer prefabricated wall panels 111 in the two prefabricated concrete formworks 11 abut against each other, no formwork is provided at this position, so as to save the cost of building the formwork and speed up the construction speed.

Exemplarily, the rebar cage 144 is a pentagonal structure and a symmetrical structure, and the connecting rebar 147 may be bent from a single rebar into three segments.

In some embodiments, referring to FIG. 26, the connecting member 14 includes a polygonal rebar cage 144 and a connecting rebar 147. Chamfer is not provided at the inside and outside of the connection position of the two prefabricated concrete formworks 11, the connecting rebar 147 is arranged close to the prefabricated wall panel 111, and located in the rebar cage 144 and the two adjacent accommodation space 112, and the rebar cage 144 is filled with the concrete 16.

The rebar cage 144 is a symmetrical hexagonal structure and a symmetrical structure. The connecting rebar 147 may be bent from a single rebar into two segments. During the concrete is cast, formwork is provided on two sides of the rebar cage 144, and the formwork may be removed after the casting.

Figure 27:
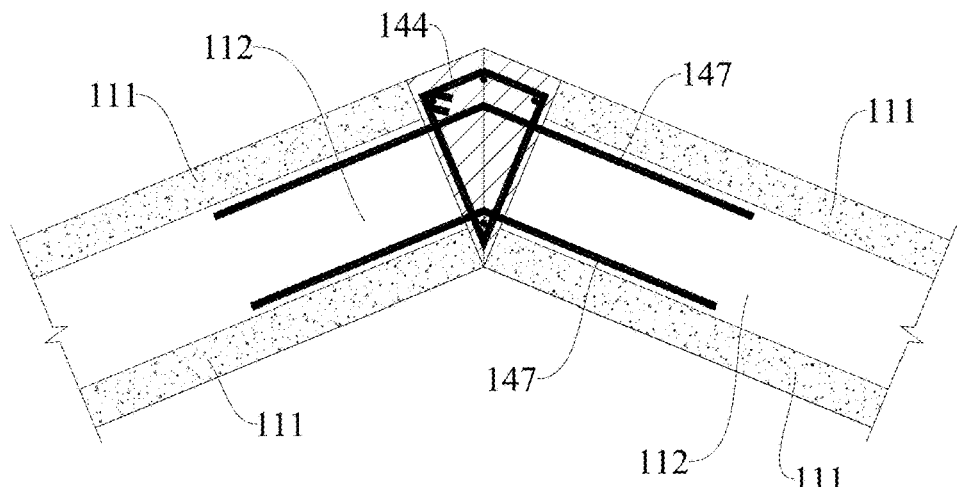
FIG. 27 is a structural view of a connection position of two adjacent prefabricated concrete formworks according to an embodiment of the present disclosure.

In some embodiments, referring to FIG. 27, the connecting member 14 includes a polygonal rebar cage 144 and a connecting rebar 147, and the two inner prefabricated wall panels 111 in the two adjacent prefabricated concrete formworks 11 abut against each other. The connecting rebar 147 is arranged close to the prefabricated wall panel 111, and located in the rebar cage 144 and the two adjacent accommodation space 112, and the rebar cage 144 is filled with the concrete 16.

The rebar cage 144 is a symmetrical quadrilateral structure, and the connecting rebar 147 may be bent into from a single rebar into two sections. During the concrete is cast, the formwork is only provided at the outside the rebar cage 144, and the formwork may be removed after the casting. The inside of the rebar cage 144 is limited by the two prefabricated wall panels 111 to shape of the cast concrete.

In some embodiments, referring to FIGS. 28 to 33, a first seal piece 18 is arranged between the two inner prefabricated wall panels 111 of the two adjacent prefabricated concrete formworks 11, and extends along a height direction of the prefabricated concrete formwork 11. A second seal piece 19 is arranged between the two outer prefabricated wall panels 111 of the two adjacent prefabricated concrete formworks 11, and extends along the height direction of the prefabricated concrete formwork 11. Both the first seal piece 18 and the second seal piece 19 have a sealing function, so as to avoid the non-solidified concrete 16 from flowing to the outside or inside of the tower during the concrete 16 is cast.

The arrangement of the first seal piece 18 and the second seal piece 19 may have a good sealing function, reduce or avoid the non-solidified concrete 16 from flowing to the outside or inside of the tower, and reduce the casting time.

Referring to FIG. 9, a joint between the adjacent prefabricated wall panels 111 is provided with a flexible seal piece 12 and a foamed adhesive 13 in sequence from inside to outside, and both the flexible seal piece 12 and the foamed adhesive 13 extend from top to bottom along the joint. The term "inside" herein refers to a space where concrete 16 needs to be cast, i.e., the accommodation cavity 112. The functions of the flexible seal piece 12 and the foamed adhesive 13 are similar to those of the first seal piece 18 and the second seal piece 19, both have the sealing function.

Figure 28:
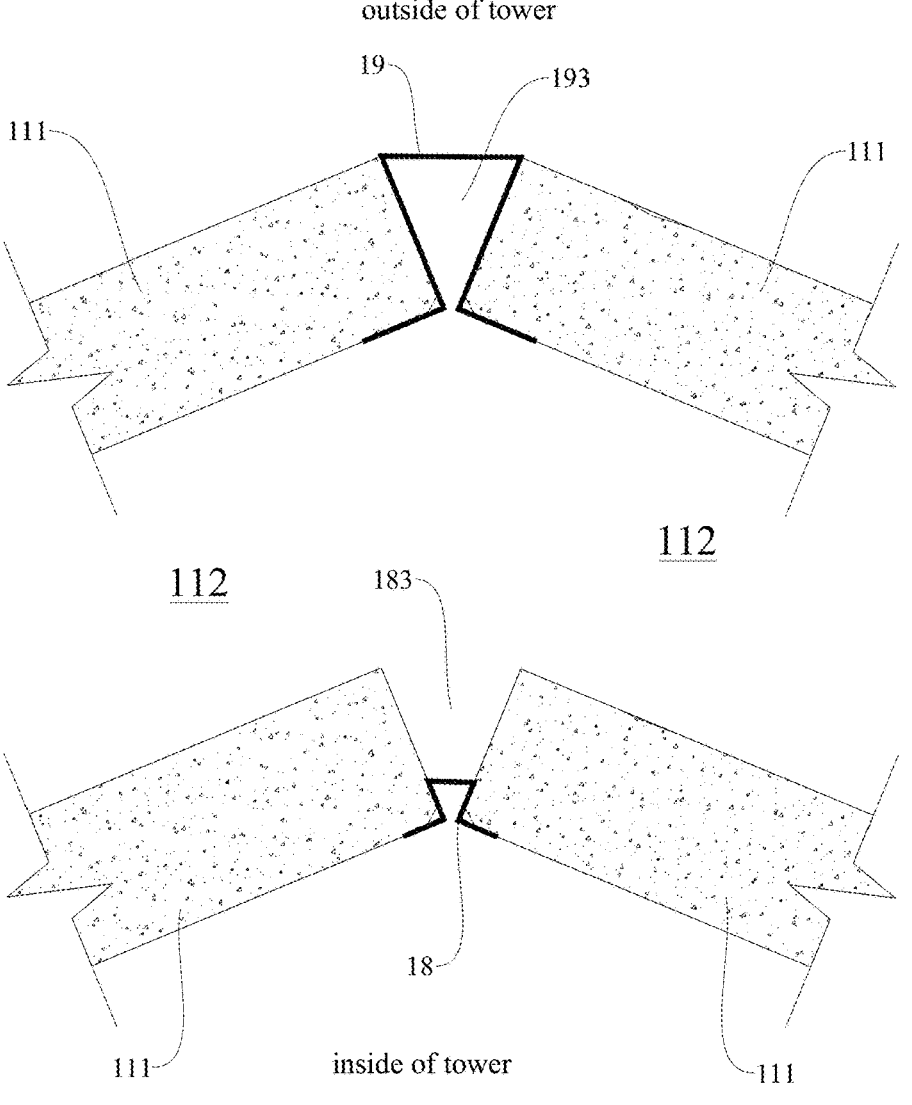
FIG. 28 is a structural view of a connection position of two prefabricated concrete formworks according to an embodiment of the present disclosure, in which connecting member and concrete are hidden.
Figures 29, 30:
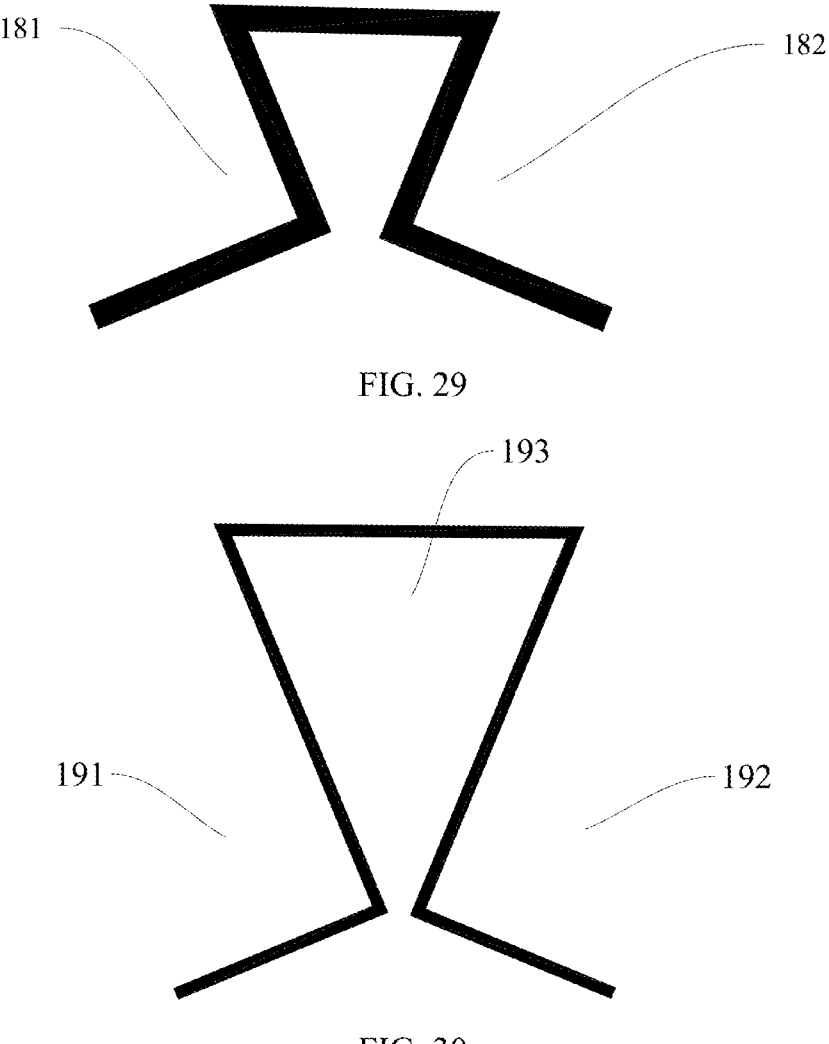
FIG. 29 is a structural view of a first bending plate according to an embodiment of the present disclosure.
FIG. 30 is a structural view of a second bending plate according to an embodiment of the present disclosure.

Referring to FIGS. 28 and 29, the first seal piece 18 includes a first bending plate having a first clamping slot 181 and a second clamping slot 182. An end corner of one of the two inner prefabricated wall panels 111 is clamped with the first clamping slot 181, and an end corner of the other of the two inner prefabricated wall panels 111 is clamped with the second clamping slot 182. Thus, the end corners of the two inner prefabricated wall panels 111 are clamped with the first bending plate, such that the position cannot be moved due to the compression of the flowing concrete 16 during the concrete 16 is cast. That is, after the first bending plate is arranged, its position does not change, and thus other supporting structures are not required during the concrete 16 is cast.

In some embodiments, a surface of the first clamping slot 181 is fitted with a surface of the corresponding end corner, and a surface of the second clamping slot 182 is fitted with a surface of the corresponding end corner. That is, shape of the first clamping slot 181 matches shape of the corresponding end corner, and shape of the second clamping slot 182 matches shape of the corresponding end corner.

Exemplarily, the first bending plate may be a symmetrical structure as a whole and may be formed by connecting five strip plates as shown in FIG. 29.

In some embodiments, a first casting space 183 is defined between the two inner prefabricated wall panels 111, located at one side of the first bending plate, and in communication with the accommodation cavity 112, so as to fill the first casting space 183 with the concrete 16. That is, the first bending plate does not completely occupy the space between the two inner prefabricated wall panels 111, but reserves a certain space (i.e. the first casting space 183), so as to improve the connection strength of the concrete 16 to the two adjacent prefabricated wall panels 111 after the concrete 16 is cast.

Figures 32, 33:
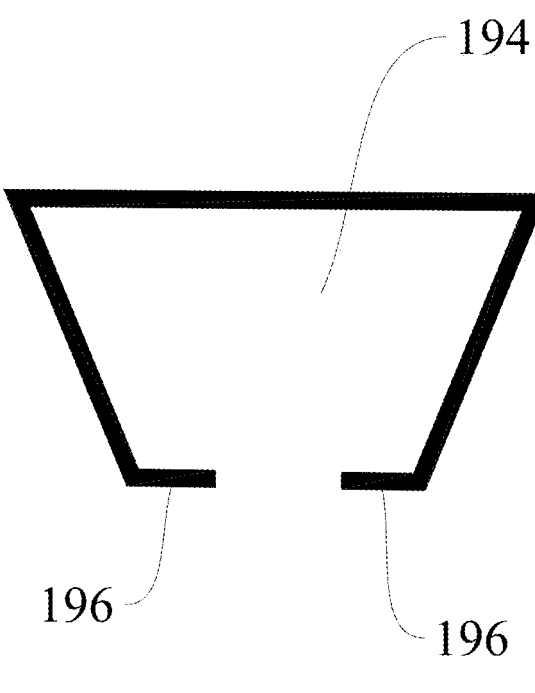
FIG. 32 is a structural view of a third bending plate according to an embodiment of the present disclosure.
FIG. 33 is a structural view of a connection position of two prefabricated wall panels close to an inside of a tubular section according to an embodiment of the present disclosure.

Referring to FIG. 33, in some embodiments, the first seal piece 18 includes a fourth bending plate, a cross section of the fourth bending plate is V-shaped, the two panel faces of the fourth bending plate are pasted on the end faces of the prefabricated wall panel 111, respectively, and the fourth bending plate has simple structure and is easy for mounting.

Referring to FIGS. 28 and 30, the second seal piece 19 includes a second bending plate having a third clamping slot 191 and a fourth clamping slot 192. An end corner of one of the two outer prefabricated wall panels 111 is clamped with the third clamping slot 191, and an end corner of the other of the two outer prefabricated wall panels 111 is clamped with the fourth clamping slot 192. Thus, the end corners of the two outer prefabricated wall panels 111 are clamped with the second bending plate, such that the position cannot be moved due to the compression of the flowing concrete 16 during the concrete 16 is cast. That is, after the second bending plate is arranged, its position does not change, and thus other supporting structures are not required during the concrete 16 is cast.

In some embodiments, a surface of the third clamping slot 191 is fitted with a surface of the corresponding end corner, a surface of the fourth clamping slot 192 is fitted with a surface of the corresponding end corner. That is, shape of the third slot 191 matches shape of the corresponding end corner, and shape of the fourth slot 192 matches shape of the corresponding end corner.

Exemplarily, the second bending plate is defined with a second casting space 193 communicated with the accommodation cavity 112 to fill the second casting space 193 with the concrete 16. By arranging the second casting space 193, the connection strength of the concrete 16 to the two adjacent prefabricated concrete formworks 11 may be improved.

Figure 31:
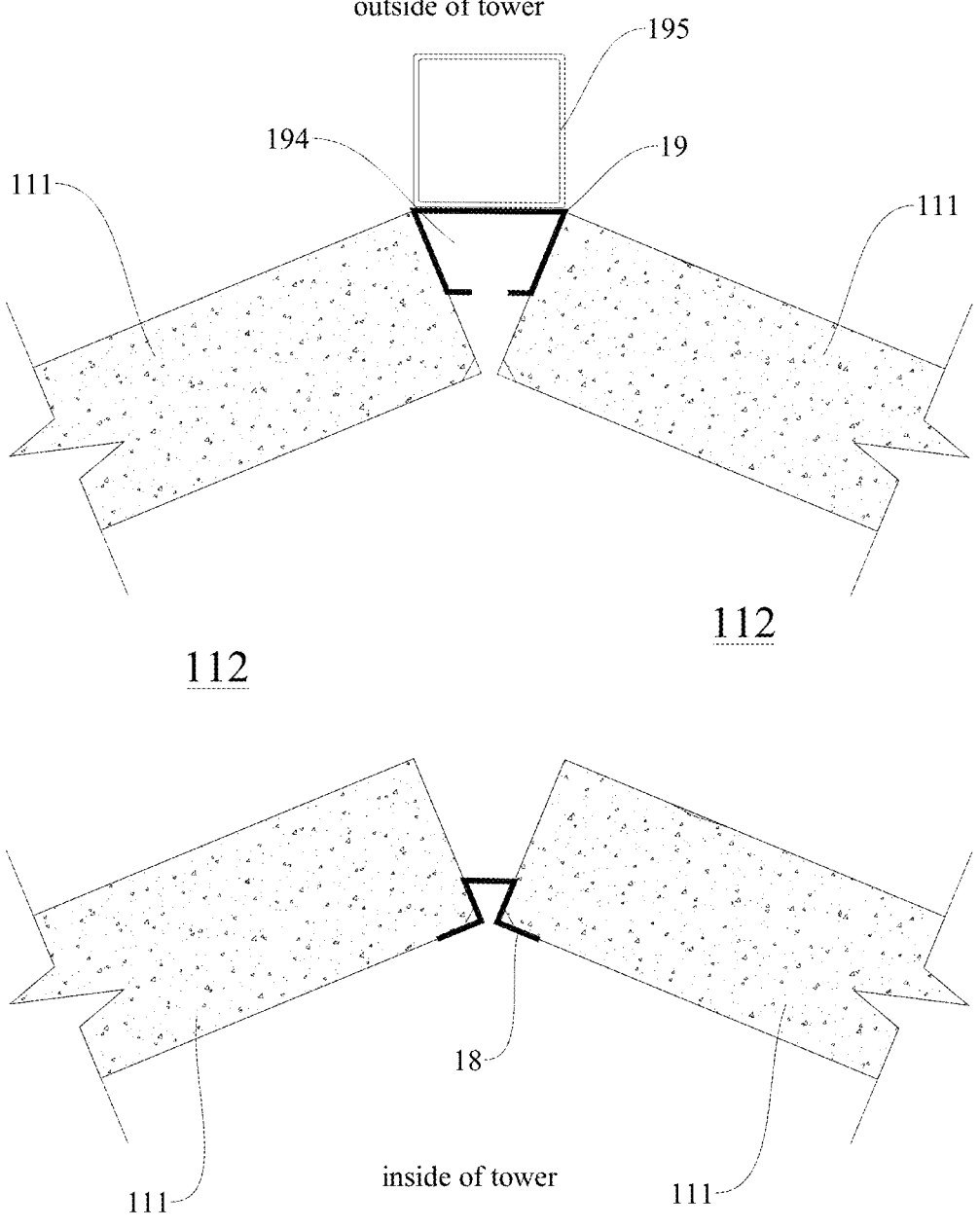
FIG. 31 is a structural view of a connection position of two prefabricated concrete formworks according to an embodiment of the present disclosure, in which connecting member and concrete are hidden.

Referring to FIG. 31 and FIG. 32, the second seal piece 19 includes a third bending plate, the two panel faces of the third bending plate are fitted with the end faces of the corresponding two prefabricated wall panels 111, respectively, the third bending plate is defined with a third casting space 194 communicated with the accommodation cavity 112 to fill the third casting space 194 with the concrete 16.

Before the concrete 16 is cast, temporary support facilities 195 may be provided on an outside of the third bending plate to ensure the stability of the position of the third bending plate during the concrete 16 is cast. After the cast concrete 16 is solidified, the temporary support facilities 195 may be removed, and the removed temporary support facilities 195 may be reused.

Referring to FIG. 32, the third bending plate is provided with an end bending plate 196 extending from an end face of the prefabricated wall panel 111 to a direction away from the end face of the prefabricated wall panel 111. The end bending plate 196 has the function of binding the cast concrete, so as to improve the connection stability between the solidified concrete 16 and the third bending plate, and avoid the third bending plate from separating from the solidified concrete 16.

The embodiments of the present disclosure provide a tower, which may be configured as a tower for wind power generation.

Referring to FIG. 1*a*, the tower of the present embodiment includes a plurality of segments of tubular sections 10 in a regular polygonal structure, and the plurality of segments of tubular sections 10 are connected to a predetermined height from bottom to top. The tubular section 10 may be implemented according to any of the above embodiments.

Referring to FIG. 2 to FIG. 5, each tubular section 10 includes a plurality of prefabricated concrete formworks 11. The plurality of prefabricated concrete formworks 11 are in a closed connection to form a regular polygonal structure. Each prefabricated concrete formwork 11 includes two prefabricated wall panels 111 spaced apart from each other and a connecting piece 113 connecting the two prefabricated wall panels 111. An accommodation space 112 is defined between the two prefabricated wall panels 111, the accommodation space 112 of the plurality of prefabricated concrete formworks 11 is in communication with each other, and all the accommodation space 112 are filled with the concrete 16, and the concrete in all the accommodation space 112 are solidified to be integral as a whole to ensure the stability of the tubular sections 10.

The prefabricated concrete formwork 11 may be purchased directly from the construction market, and size of the prefabricated concrete formwork 11 may be 3.1 m×12 m, so as to fit different wind turbines with different specifications. The prefabricated wall panel 111 is in a shape of flat plate, and local positions may be adjusted according to the requirements, such as, chamfers being arranged at the end, inclined plane being arranged at the end, length of the two corresponding prefabricated wall panels 111, etc. The lengths of the two corresponding prefabricated wall panels 111 may be the same or different, and may be arranged as required.

In some embodiments, the tower further includes a plurality of prestressed steel strands arranged outside the tubular section 10, and two ends of the prestressed steel strands are connected to different tubular sections 10, respectively. The prestressed steel strands tighten the tubular section 10 to improve the overall structural stability of the tower. The prestressed steel strand may also be arranged on the inside of the tubular section 10 as required.

Figure 10:
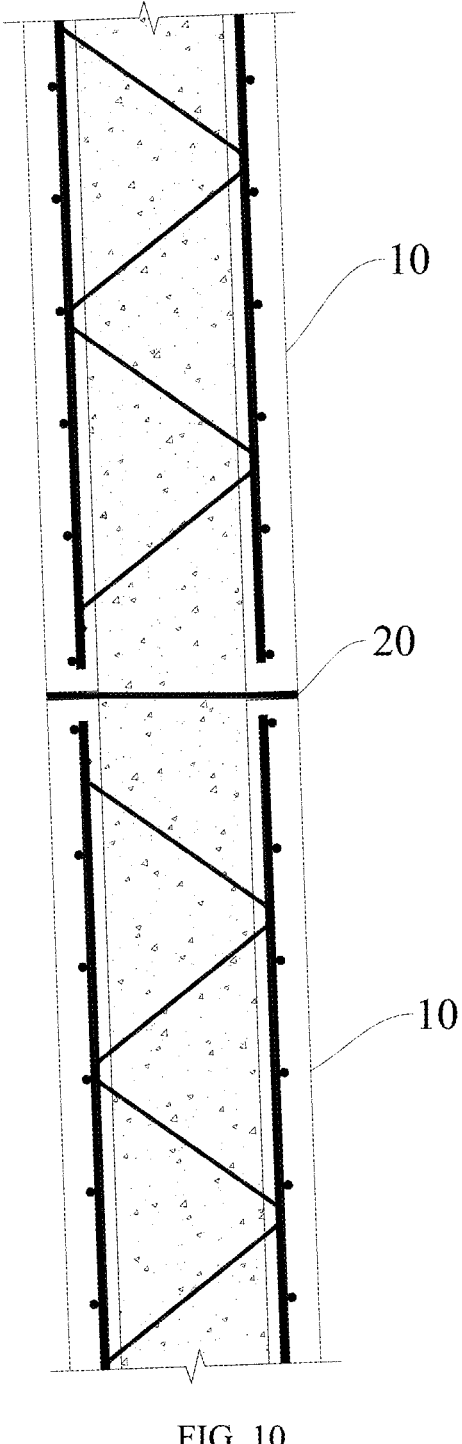
FIG. 10 is a schematic view of connection position of upper and lower tubular sections according to an embodiment of the present disclosure.

Referring to FIG. 10, there is an epoxy resin mortar layer 20 connecting the upper and lower adjacent tubular sections 10 between the upper and lower adjacent tubular sections 10, and thickness of the epoxy resin mortar layer 20 ranges from 7 mm to 13 mm, for example, may be 8 mm, 9 mm, 10 mm, 11 mm, 12 mm, etc.

The epoxy resin mortar layer 20 has a strong bonding effect and may improve the connection reliability between the upper and lower adjacent tubular sections 10. The thickness of the epoxy resin mortar layer 20 may be arranged according to the position of the tubular section 10 and the angle of the prefabricated concrete formwork 11.

In some embodiments, an included angle between the prefabricated concrete formwork 11 and a horizontal plane ranges from 87° to 90°, such as 88°, 89°, etc. That is, the prefabricated concrete formwork 11 for at least a part of the tower may be placed non-vertically. Referring to FIG. 1*a*, a maximum transverse size of a bottom portion of the tower is greater than a maximum transverse size of an upper portion of the tower. An upper section of the tower may also be provided with the prefabricated concrete formwork 11 to be perpendicular to the horizontal plane, i.e. to be arranged vertically. Thus, there are at least two types of the tubular sections, a first type is an equal diameter tubular section with equal inner diameter, and a second type is a variable diameter tubular section with non-equal diameter. The variable diameter tubular section has a certain taper. The equal diameter herein refers to an inscribed circle diameter or circumscribed circle diameter of the tubular section 10.

Figure 1B:
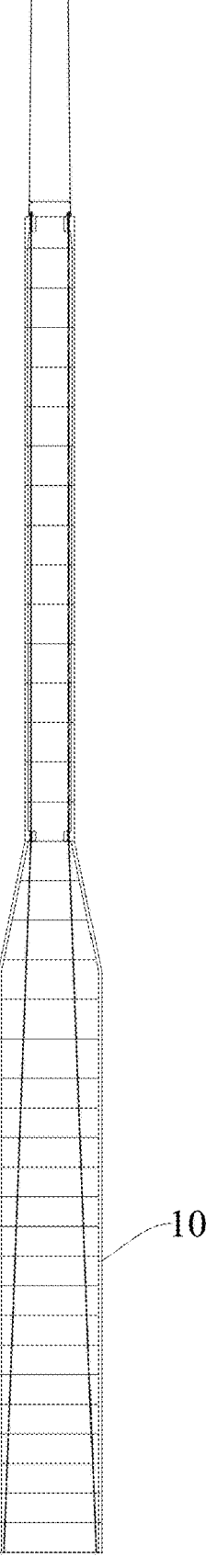
FIG. 1b shows a front view of a tower of an embodiment of the present disclosure.

Referring to FIG. 1*a*, the whole tower may be divided into two parts. A lower part adopts the variable diameter tubular section and an upper part adopts the equal diameter tubular section; Referring to FIG. 1*b*, the whole tower may be divided into three parts. A lower part adopts the equal diameter tubular section with relatively large inner diameter, a middle part adopts the variable diameter tubular section with a certain taper, and an upper part adopts the equal diameter tubular section with relatively small inner diameter.

Since some prefabricated concrete formworks 11 have a certain inclination angle, and the top and bottom of the prefabricated concrete formworks 11 are at right angles, when the produced prefabricated concrete formworks 11 are placed obliquely, the top has a slight height difference. In order to control the height difference within 3 mm, the inclination angle in designing the tower may be less than 3 degrees, and the included angle between the prefabricated concrete formwork 11 and a horizontal plane ranges from 87° to 90°. During the casting in the splicing site, top surface of the tubular section 10 may be cast into a plane. The bottom of the tubular section 10 is leveled by about 10 mm thick epoxy resin, and that is, when the upper tubular section 10 is placed on the unhardened epoxy resin, the tubular section may be naturally flattened.

The embodiments of the present disclosure further provide a construction method for a tower, including the following steps:

S1, providing prefabricated concrete formworks 11, each prefabricated concrete formwork 11 including two prefabricated wall panels 111 spaced apart from each other and a connecting piece 113 connecting the two prefabricated wall panels 111, an accommodation space 112 being defined between the two prefabricated wall panels 111; hoisting a plurality of prefabricated concrete formworks 11 to the splicing platform in sequence to form a regular polygonal structure, and the accommodation space 112 of the plurality of prefabricated concrete formworks 11 being in communication with each other;

S2, casting the concrete 16 into all accommodation space 112, and the tubular sections 10 being prepared after the concrete 16 is solidified;

S3, hoisting the prepared tubular sections 10 in turn and the tubular sections 10 being connected with each other to a predetermined height.

The method utilizes product of the prefabricated concrete formwork of the construction industry, and the product is used for the construction of civil buildings (such as houses) in the construction industry. In civil buildings, the connection joints of the prefabricated concrete formworks are mostly L-shaped and T-shaped, and each floor is separated by a floor slab. The prefabricated concrete formwork 11 of the above method is directly transported to the construction site for splicing, which has high structural stability, saves formwork manufacturing cost and transportation cost.

In some embodiments, referring to FIG. 3, hoisting prefabricated concrete formwork 11 includes the following steps: casting a concrete block 15 with a hook in the prefabricated concrete formwork 11, and hoisting the prefabricated concrete formwork 11 to the splicing platform through the hook. Specifically, the concrete block 15 with hook may be cast first, and then during the production of the prefabricated concrete formwork, the concrete block 15 with hook and prefabricated concrete formwork may be cast as a whole to ensure the firmness of the casting. The concrete block 15 and the concrete 16 cast in the accommodation space 112 may be integrated as a whole and expose the hook out, so as to facilitate the hoisting operation.

If the concrete block 15 is not provided, the prefabricated concrete formwork 11 may 11 may also be temporarily hoisted through truss rebar, then a sleeve may be provided in the accommodation space 112 when the concrete 16 is cast into the accommodation space 112, after the cast concrete 16 is solidified, the hook is screwed onto the embedded sleeve.

In some embodiments, S1 further includes providing a connecting member 14 between two adjacent prefabricated concrete formworks 11. The connecting member 14 may improve the connection reliability between the adjacent prefabricated concrete formworks 11. The specific embodiment may be implemented with reference to the above description.

In some embodiments, S1 further includes providing a flexible seal piece 12 and a foamed adhesive 13 at the joint between two adjacent prefabricated wall panels 111 from inside to outside. The arrangement of the connecting member 14, the arrangement of the flexible seal piece 12 and the foamed adhesive 13 may be constructed simultaneously, so as to speed up the construction efficiency and shorten the construction cycle.

Both the flexible seal piece 12 and the foamed adhesive 13 are configured for sealing, so as to avoid the concrete from flowing out of the joint during the subsequent casting. S2 is performed after the flexible seal piece 12 and the foamed adhesive 13 are stabilized.

In some embodiments, in S3, the upper and lower adjacent tubular sections 10 are connected by epoxy resin mortar. The included angle between the prefabricated concrete formwork 11 and the horizontal plane ranges from 87° to 90°, and the bottom of the tubular section 10 located at the upper side is leveled by the epoxy resin mortar.

The embodiments further provide a wind turbine tower, including the tower of any one of the above embodiments and a wind power generation device arranged on top of the tower. The wind turbine tower has low construction cost and high stability.

In the specification of the present disclosure, it should be understood that, terms such as "central," "longitudinal," "lateral," "length," "width," "thickness," "upper," "lower," "front," "rear," "left," "right," "vertical," "horizontal," "top," "bottom," "inner," "outer," "clockwise", "counter clockwise", "axial", "radial", and "circumferential" indicate the orientation or position relationship based on the orientation or position relationship illustrated in the drawings only for convenience of description or for simplifying description of the present disclosure, and do not alone indicate or imply that the device or element referred to must have a particular orientation or be constructed and operated in a specific orientation, and hence cannot be construed as limitation to the present disclosure.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

In the present disclosure, it should be noted, unless specified or limited otherwise, the terms "mounted," "connected," "coupled", "fixed" or the like are used broadly. The terms may indicate, for example, fixed connections, detachable connections, or integral connections, may also indicate mechanical or electrical connections or mutual communication, may also indicate direct connections or indirect connections via intermediate mediums, and may also indicate inner communications of two elements or the interaction between two elements. The specific meanings of the terms in embodiments of the present disclosure should be understood by those skilled in the art according to particular circumstances.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "up", "above" and "on" the second feature may be that the first feature is directly above or obliquely above the second feature, or merely be that the first feature has a level higher than the second feature. The first feature "down", "below" and "under" the second feature may be that the first feature is directly below or obliquely below the second feature, or merely be that the first feature has a level less than the second feature.

Reference throughout the present disclosure to "one embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although the embodiments of the present disclosure have been shown and described, it is understood that the above-described embodiments are illustrative and are not to be construed as limiting the scope of the disclosure. Those skilled in the art may change, modify, alternate and vary the above embodiments within the scope of the present disclosure.

What is claimed is:

1. A tubular section (10) comprising:
a plurality of prefabricated concrete formworks (11), wherein the plurality of prefabricated concrete formworks (11) are in a closed connection to form a regular polygonal structure, each prefabricated concrete formwork (11) comprises two prefabricated wall panels (111) spaced apart from each other and a connecting piece (113) connecting the two prefabricated wall panels (111), an accommodation cavity (112) is defined between the two prefabricated wall panels (111), the accommodation cavities (112) of the plurality of prefabricated concrete formworks (11) are in communication with each other, all the accommodation cavities (112) are filled with concrete (16), and the concrete (16) in all the accommodation cavities (112) is solidified to be integral as a whole;
wherein a joint between the adjacent prefabricated wall panels (111) is provided with a flexible seal piece (12) and a foamed adhesive (13) in sequence from inside to outside, and both the flexible seal piece (12) and the foamed adhesive (13) extend from top to bottom along the joint.

2. The tubular section (10) according to claim 1, wherein the prefabricated wall panel (111) has an inner panel face (1111), an outer panel face (1112), and a side end face (1113), the inner panel face (1111) is parallel to the outer panel face (1112), the inner panel face (1111) is inclined relative to the side end face (1113);
the joint between the adjacent prefabricated wall panels (111) is located between two opposite side end faces (1113), and the two opposite side end faces (1113) are parallel to each other,
wherein at least one of the two opposite side end faces (1113) is defined with a groove extending from top to bottom along the joint, and at least one of the flexible seal piece (12) or foamed adhesive (13) is located in the groove.

3. The tubular section (10) according to claim 1, wherein the prefabricated wall panel (111) has an inner panel face (1111), an outer panel face (1112), and a side end face (1113), the inner panel face (1111) is parallel to the outer panel face (1112), the side end face (1113) is perpendicular to the inner panel face (1111);
the joint between the adjacent prefabricated wall panels (111) is located between two opposite side end faces (1113), and the side end faces (1113) are provided with chamfers (1115) at a position where spacing of the joint is minimal.

4. The tubular section (10) according to claim 1, wherein the prefabricated wall panel (111) has an inner panel face (1111), an outer panel face (1112), and a side end face (1113), the inner panel face (1111) is parallel to the outer panel face (1112), the inner panel face (1111) is inclined relative to the side end face (1113);
the joint between the adjacent prefabricated wall panels (111) is located between two opposite side end faces (1113), an included angle between two opposite side end faces (1113) ranges from 5° to 10°, and spacing of the joint gradually decreases from inside to outside.

5. The tubular section (10) according to claim 1, wherein the prefabricated wall panel (111) has an inner panel face (1111), an outer panel face (1112), and a side end face (1113), the inner panel face (1111) is parallel to the outer panel face (1112), and the side end face (1113) is in a stepped structure;
the joint between the adjacent prefabricated wall panels (111) is located between two opposite side end faces (1113), the joint is divided into at least two segments from inside to outside, a maximum value of spacing of the joint between inner joint segments is greater than a maximum value of the spacing of the joint between outer joint segments.

6. The tubular section (10) according to claim 1, wherein the prefabricated wall panel (111) has an inner panel face (1111), an outer panel face (1112), and a side end face (1113), the inner panel face (1111) is parallel to the outer panel face (1112);
the joint between the adjacent prefabricated wall panels (111) is located between two opposite side end faces (1113) and spacing of the joint gradually decreases from inside to outside; and
at least one of the two opposite side end faces (1113) is defined with a groove extending from top to bottom along the joint, and the flexible seal piece (12) and/or foamed adhesive (13) are located in the groove.

7. The tubular section (10) according to claim 1, wherein an extension portion (1101) is formed at a side end of each prefabricated wall panel (111), and the opposite extension portions (1101) of the adjacent prefabricated wall panels (111) are staggered with each other, such that the joint deviates from a radial direction of the tubular section (10);
an expansion strip (17) is provided in the joint and extends from top to bottom along the joint.

8. The tubular section (10) according to claim 1, further comprising a connecting member (14), the connecting member (14) being provided between any adjacent prefabricated concrete formworks (11) and located in adjacent accommodation cavity (112), and the connecting member (14) being cast in the concrete (16).

9. The tubular section (10) according to claim 8, wherein the connecting member (14) comprises at least one rebar grid sheet (146), the rebar grid sheet (146) is located in middle of the two prefabricated wall panels (111), or the rebar grid sheet (146) is attached to an inner wall of the prefabricated wall panel (111).

10. The tubular section (10) according to claim 8, wherein the connecting member (14) comprises a plurality of steel wire ropes (141) and a plurality of rebar anchor rings (142), a rebar anchor ring (142) is embedded in an inner wall of each prefabricated wall panel (111), each steel wire rope (141) passes through corresponding rebar anchor rings (142), and the plurality of steel wire ropes (141) are overlapped in the adjacent prefabricated concrete formworks (11), wherein the steel wire rope (141) is a closed quoit, and a vertical rebar is inserted in the overlapped steel wire ropes (141), and extends along a height direction of the prefabricated concrete formwork (11).

11. The tubular section (10) according to claim 8, wherein the connecting member (14) comprises a polygonal rebar cage (144) and a connecting rebar (147), the rebar cage (144) extends from top to bottom along a side end of the prefabricated concrete formwork (11), and the connecting rebar (147) passes through both the rebar cage (144) and the adjacent accommodation cavity (112), and the rebar cage (144) is filled with the concrete (16).

12. The tubular section (10) according to claim 11, wherein:

an inner chamfer is provided at a connection position of the two prefabricated concrete formworks (11), or no chamfer is provided at an inside and outside of the connection position of the two prefabricated concrete formworks (11); and the connecting rebar (147) is arranged close to the prefabricated wall panel (111).

13. The tubular section (10) according to claim 11, wherein two outer prefabricated wall panels (111) in the adjacent prefabricated concrete formworks (11) abut against each other, or two inner prefabricated wall panels (111) in the adjacent prefabricated concrete formworks (11) abut against each other; and the connecting rebar (147) is arranged close to the two inner prefabricated wall panels (111).

14. The tubular section (10) according to claim 8, wherein the connecting member (14) comprises a polygonal rebar cage (144), a rebar piece (1114) is provided in the prefabricated wall panel (111), at least a part of the rebar piece (1114) extends into the rebar cage (144), and the rebar cage (144) is filled with the concrete (16);

and two edges of the rebar cage (144) overlap with the rebar piece (1114), a connection position of the two prefabricated concrete formworks (11) is provided with an inner chamfer and an outer chamfer, and the two edges of the rebar cage (144) form the inner chamfer and outer chamfer of the connection position of the two prefabricated concrete formworks (11); or a connection position of the two prefabricated concrete formworks (11) is provided with an inner chamfer, one edge of the rebar cage (144) forms the inner chamfer of the connection position of the two prefabricated concrete formworks (11), and the rebar pieces (1114) in the adjacent prefabricated wall panels (111) are staggered with each other.

15. The tubular section (10) according to claim 1, wherein a first seal piece (18) is arranged between the two inner prefabricated wall panels (111) of the two adjacent prefabricated concrete formworks (11), and extends along a height direction of the prefabricated concrete formwork (11);

a second seal piece (19) is arranged between the two outer prefabricated wall panels (111) of the two adjacent prefabricated concrete formworks (11), and extends along the height direction of the prefabricated concrete formwork (11).

16. The tubular section (10) according to claim 15, wherein the first seal piece (18) comprises a first bending plate having a first clamping slot (181) and a second clamping slot (182);

an end corner of one of the two inner prefabricated wall panels (111) is clamped with the first clamping slot (181), and an end corner of the other of the two inner prefabricated wall panels (111) is clamped with the second clamping slot (182), wherein a surface of the first clamping slot (181) is fitted with a surface of a corresponding end corner, and a surface of the second clamping slot (182) is fitted with a surface of a corresponding end corner; and a first casting space (183) is defined between the two inner prefabricated wall panels (111), located at one side of the first bending plate, and in communication with the accommodation cavity (112), to fill the first casting space (183) with the concrete (16).

17. The tubular section (10) according to claim 15, wherein the second seal piece (19) comprises a second bending plate having a third clamping slot (191) and a fourth clamping slot (192);

an end corner of one of the two outer prefabricated wall panels (111) is clamped with the third clamping slot (191), and an end corner of the other of the two outer prefabricated wall panels (111) is clamped with the fourth clamping slot (192);

wherein a surface of the third clamping slot (191) is fitted with a surface of a corresponding end corner, a surface of the fourth clamping slot (192) is fitted with a surface of a corresponding end corner; and the second bending plate is defined with a second casting space (193) communicated with the accommodation cavity (112) to fill the second casting space (193) with the concrete (16).

18. The tubular section (10) according to claim 15, wherein the second seal piece (19) comprises a third bending plate, two panel faces of the third bending plate are fitted with end faces of corresponding two prefabricated wall panels (111), respectively, the third bending plate is defined with a third casting space (194) communicated with the accommodation cavity (112) to fill the third casting space (194) with the concrete (16);

the third bending plate is provided with an end bending plate (196) extending from an end face of the prefabricated wall panel (111) to a direction away from the end face of the prefabricated wall panel (111).

19. A tower comprising a plurality of segments of tubular sections (10) according to claim 1, and the plurality of segments of tubular sections (10) being connected to a predetermined height from bottom to top.

20. A wind turbine tower, comprising the tower of claim 19 and a wind power generation device arranged on top of the tower.

* * * * *